US006842623B2

(12) United States Patent
Koscal

(10) Patent No.: US 6,842,623 B2
(45) Date of Patent: Jan. 11, 2005

(54) SYSTEM AND METHOD FOR WIRELESS VOICE AND COMPUTER COMMUNICATION

(75) Inventor: Michael E. Koscal, Aliso Viejo, CA (US)

(73) Assignee: Skyworks Solutions, Inc., Newport Beach, CA (US)

( * ) Notice: Subject to any disclaimer, the term of this patent is extended or adjusted under 35 U.S.C. 154(b) by 246 days.

(21) Appl. No.: 09/974,769

(22) Filed: Oct. 9, 2001

(65) Prior Publication Data

US 2002/0115457 A1 Aug. 22, 2002

Related U.S. Application Data

(63) Continuation of application No. 09/109,987, filed on Jun. 30, 1998, now Pat. No. 6,327,476.

(51) Int. Cl.$^7$ ............................................. H04Q 7/20
(52) U.S. Cl. .................... 455/462; 455/557; 455/556.1; 455/524
(58) Field of Search .................. 455/462, 463, 455/464, 556.1, 556.2, 557; 370/321, 347

(56) References Cited

U.S. PATENT DOCUMENTS

| | | | |
|---|---|---|---|
| 5,005,168 A | | 4/1991 | Cummisky et al. ......... 370/276 |
| 5,978,688 A | | 11/1999 | Mullins et al. ............. 455/557 |
| 6,021,325 A | * | 2/2000 | Hall ....................... 455/557 X |
| 6,026,308 A | | 2/2000 | Hsieh ......................... 455/557 |
| 6,128,510 A | * | 10/2000 | Beukema et al. ........... 455/557 |
| 6,327,476 B1 | | 12/2001 | Koscal ....................... 455/462 |

* cited by examiner

*Primary Examiner*—Nick Corsaro
*Assistant Examiner*—Philip J. Sobutka
(74) *Attorney, Agent, or Firm*—Knobbe Martens Olson & Bear, LLP

(57) ABSTRACT

A system and method for wireless voice and computer communications sample voice data from an audio input or telephone line, convert the sampled data with a codec and audio engine to compressed, digital samples, generate RF signals representing the digital samples with a wireless modem, transmit and receive RF frames including such RF signals with a radio transceiver, decompress digital samples with the audio engine, convert the digital samples to analog with the codec and output analog audio signals. The system and method also receive bitstream data from a computer with a communication port or from a telephone line with a modem, generate RF signals representing the bitstream data with the wireless modem, transmit and receive with the radio transceiver RF frames including RF signals representing bitstream data, and output to a computer or telephone line bitstream data. The system and method use a frame format protocol to transmit a plurality of RF frames representing bitstream data during a time period when no RF frames are received, and to receive a plurality of RF frames representing bitstream data during a time period when no RF frames are transmitted. The system and method dynamically or by command adjust the frame format protocol to increase or reduce the number of RF frames representing bitstream data that are transmitted or received during a time period in which, respectively, no RF frames are received or transmitted.

7 Claims, 16 Drawing Sheets

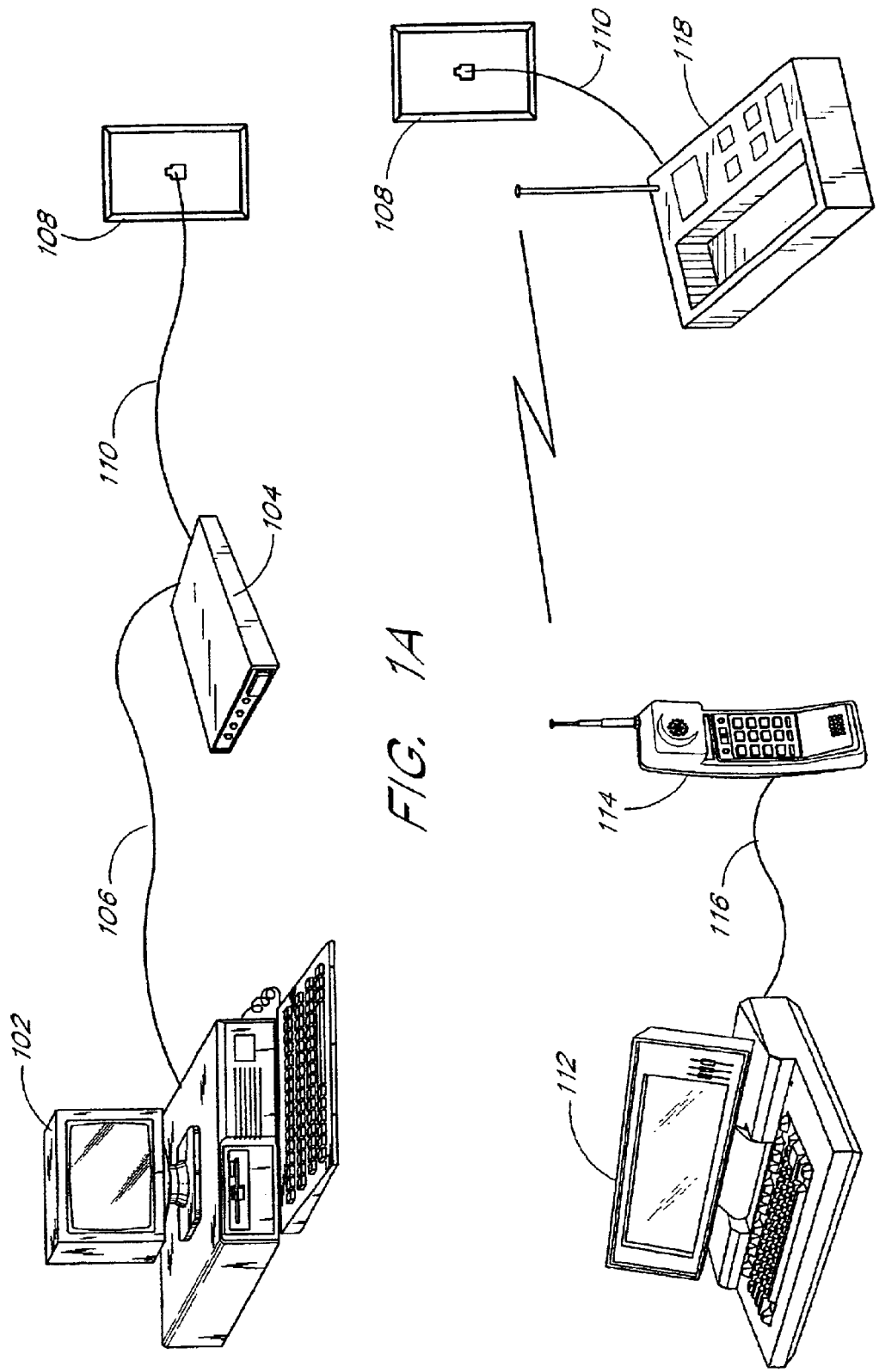

SYSTEM AND METHOD FOR WIRELESS VOICE AND COMPUTER COMMUNICATION

REFERENCE TO RELATED APPLICATION

The present application is a continuation of and claim priority benefit under 35 U.S.C. §120 from U.S. patent application Ser. No. 09/109,987, filed Jun. 30, 1998, entitled "SYSTEM AND METHOD FOR WIRELESS VOICE AND COMPUTER COMMUNICATION USING A WIRELESS LINK TO A PUBLIC TELEPHONE NETWORK," now U.S. Pat. No. 6,327,476, which is incorporated herein by reference.

BACKGROUND OF THE INVENTION

1. Field of the Invention

This invention relates to radio communications. More specifically, the invention provides a system and method for both voice-to-voice and computer-to-computer communication using a wireless link to the public telephone network.

2. Description of the Related Art

For decades, people have been using the public telephone system for voice communications. Traditionally, people have used telephones comprising a handset attached by a cord to a dialing unit. Such telephones connect to the telephone system with a telephone line plugged into the telephone at one end and to a telephone jack (typically wired into a wall) at the other end. To make telephone calls using these telephones, a person generally must stay within a few feet of a telephone jack and cannot roam about freely while conversing on the telephone.

Existing radio-based wireless telephone systems comprising a handset and a base now provide a wireless link to the telephone system. The handset of a wireless telephone system samples and encodes the voice signals generated by a person talking into the handset, and transmits the encoded voice signals to the base, which decodes the voice signals and transmits the decoded voice signals to the telephone system. Radio transceivers in both the handset and base exchange encoded voice signals. Because the wireless handset does not have or need a cord attached to the base, a person can roam about while conversing over the telephone network and need not remain within a few feet of telephone jack. Such handset and base systems have become relatively common in households across the United States.

In addition to telephones, however, people now demand computers connected to the public telephone network. In just the last few years, the number of people using computers to engage in data communications over the public telephone system has increased from merely a few hundred thousand to well into the tens of millions. With the astronomical rise in the usage and popularity of the Internet and World Wide Web, the number of people connecting computers to the public telephone system is growing at a feverish pace.

Computers use modems to communicate with other computers over the telephone system, and each modem generally requires a connection to a telephone line. Thus, people desiring to connect their computers to a telephone line must now locate the computer near a telephone jack in the lab, home or office, and run a telephone line from the telephone jack to the modem connected to the computer. Users now must make a choice whether to connect a telephone or a computer to a telephone jack.

SUMMARY OF THE INVENTION

The present invention provides a wireless handset and base which perform both voice communication and efficient data communication.

One aspect of the present invention is a wireless handset. The wireless handset comprises: (1) a communication port; (2) a communication port controller responsive to first data received at the communication port to buffer the first data; (3) an audio input line; (4) a codec responsive to a sampling interrupt to generate an audio sample from audio data received at the audio input line; (5) a wireless modem responsive to a first signal to encode the first data in a first frame, and responsive to a second signal to encode the audio sample in a second frame; and (6) a radio transceiver responsive to the first signal and to a frame interrupt to transmit an RF signal frame representing the first frame, and responsive to the second signal and to the frame interrupt to transmit an RF signal frame representing the second frame.

Another aspect of the present invention is a wireless handset. The wireless handset comprises: (1) a communication port; (2) a communication port controller responsive to first data received at the communication port to buffer the first data; (3) an audio input line; (4) a codec responsive to a sampling interrupt to generate an audio sample from audio data received at the audio input line; (5) a wireless modem responsive to a first signal to encode the first data in first and second frames, and responsive to a second signal to encode the audio sample in a third frame; and (6) a radio transceiver responsive to the first signal and to a frame interrupt to transmit a plurality of RF signal frames representing the first and second frames before receiving an RF frame, and responsive to the second signal and to the frame interrupt to transmit an RF signal frame representing the third frame.

A still further aspect of the present invention is a wireless handset. The wireless handset comprises: (1) a microcontroller; (2) a data memory; (3) a computer communication port; (4) an outgoing data buffer storing data bits received at the computer communication port; (5) an audio input; (6) a codec; (7) a frame buffer storing bits to be represented by an RF signal; (8) a sample transfer routine comprising instructions stored in the data memory, the instructions executable by the microcontroller, the sample transfer routine responsive to a codec interrupt to transfer first audio samples received at the audio input to the codec, and to transfer second audio samples from the codec to the frame buffer; and (9) a data transfer routine comprising instructions stored in the data memory, the instructions executable by the microcontroller, the data transfer routine responsive to the codec interrupt to transfer data from the outgoing data buffer to the frame buffer. In one embodiment, the wireless handset further comprises (10) a radio transceiver; (11) a frame receive buffer storing bits representing RF signals received by the radio transceiver; and (12) an incoming data buffer storing data bits transferred from the frame receive buffer by the data transfer routine in response to the codec interrupt. In another embodiment, the wireless handset further comprises: (13) a data communication establishment routine comprising instructions stored in the data memory, the instructions executable by the microcontroller, the data communication establishment routine responsive to a data communication signal at the computer communication port to disable the sample transfer routine and to enable the data transfer routine. In still another embodiment, the wireless handset further comprises: (14) a jump table associating the address of the sample transfer routine with the codec interrupt, the data communication establishment routine disabling the sample transfer routine and enabling the data transfer routine by replacing in the jump table the address of the sample transfer routine with the address of the data transfer routine.

Another aspect of the present invention is a wireless base. The wireless base comprises: (1) a telephone line interface;

(2) a data communication interface; (3) a modem responsive to data communication signals on the telephone line interface to generate a bitstream representing at least a portion of the data communication signals, and to transmit the bitstream to the data communication interface; (4) a communication port controller coupled to the data communication interface responsive to first data received at the data communication interface to buffer the first data; (5) a codec responsive to a sampling interrupt to generate an audio sample from audio data received on the telephone line interface; (6) a wireless modem responsive to a first signal to encode the first data in first and second frames, and responsive to a second signal to encode the audio sample in a third frame; and (7) a radio transceiver responsive to at least one frame interrupt to transmit a plurality of RF signal frames representing the first and second frames before receiving an RF frame, and responsive to another of the frame interrupts to transmit an RF signal frame representing the third frame.

A still further aspect of the present invention is a wireless base comprising: (1) a microcontroller; (2) a data memory; (3) a data communication interface; (4) a data buffer storing data received at the data communication interface; (5) a telephone line interface; (6) a codec; (7) a frame buffer storing bits to be represented by an RF signal; (8) a sample transfer routine comprising instructions stored in the data memory, the instructions executable by the microcontroller, the sample transfer routine responsive to a codec interrupt to transfer first audio samples received at the telephone line interface to the codec, and to transfer second audio samples from the codec to the frame buffer; and (9) a data transfer routine comprising instructions stored in the data memory, the instructions executable by the microcontroller, the data transfer routine responsive to the codec interrupt to transfer data from the data buffer to the frame buffer. In one embodiment, the wireless base further comprises: (10) a radio transceiver; (11) a frame receive buffer storing bits representing RF signals received by the radio transceiver; and (12) a second data buffer storing data bits transferred from the frame receive buffer by the data transfer routine in response to the codec interrupt. In still another embodiment, the wireless base further comprises: (13) an RF channel interpreter routine comprising instructions stored in the data memory, the instructions executable by the microcontroller, the RF channel interpreter routine responsive to bit patterns received in the frame receive buffer to disable the sample transfer routine and to enable the data transfer routine.

A method in accordance with another aspect of the present invention comprises the steps of: (1) receiving a first analog audio sample at an audio input of a wireless communication device; (2) converting the first analog audio sample to a first digital audio sample; (3) compressing the digital audio sample to a create a first compressed audio sample; (4) generating first RF signals to represent the first compressed audio sample; (5) transmitting with a radio transceiver the first RF signals in a first RF signal frame; (6) receiving with the radio transceiver a second RF signal frame including second RF signals; (7) decompressing the second RF signals to create a second digital audio sample; (8) converting the second digital audio sample to a second analog audio sample; (9) transmitting the second analog audio sample to an audio output of the wireless communication device; (10) receiving first data at a communication port of the wireless communication device; (11) generating third RF signals representing the first data; and (12) transmitting with the radio transceiver the third RF signals in third and fourth consecutive RF frames, the radio transceiver receiving no RF frame between the transmission of the third and fourth RF frames. In one embodiment, the method the first, second, third and fourth RF frames have the same duration and are transmitted at the same frequency, and the number of data bits represented in the fourth RF frame exceeds the number of data bits represented in the third RF frame and also exceeds the number of compressed audio sample bits represented in the first and second RF frames. In another embodiment, the method comprises the further steps of: (13) determining that a different frame format protocol will be used; (14) completing the transfer of any data in data buffers of the wireless communication device; (15) transmitting an RF data frame to a second wireless communication device, the RF data frame specifying the different frame format protocol; and (16) establishing a new wireless link wherein the wireless communication device and the second wireless communication device use the different frame format protocol.

Another aspect of the present invention is a wireless voice and data communication system comprising: (1) a base having (a) a telephone line interface, (b) a codec connected to the telephone line interface, the codec responsive to a codec interrupt to generate a first audio sample from voice data received at the telephone line interface, the codec responsive to the codec interrupt to generate voice data from a second audio sample, (c) a data communication interface, (d) a modem connected to the telephone line interface and to the data communication interface, the modem responsive to first data received at the telephone line interface to generate a bitstream representing the first data and to transmit the bitstream to the data communication interface, the modem responsive to second data received at the data communication interface to generate a representation of the second data and to transmit the representation to the telephone line interface, (e) a ROM, (f) a microcontroller, (g) an RF frame transmit buffer, (h) an RF frame receive buffer, (i) a sample transfer routine comprising software instructions stored in the ROM, the software instructions executable by the microcontroller, the sample transfer routine responsive to a first codes interrupt to transfer the first audio sample to the RF frame transmit buffer and to transfer the second audio sample from the RF frame receive buffer to the codec, (j) a data transfer routine comprising software instructions stored in the ROM, the software instructions executable by the microcontroller, the data transfer routine responsive to a second codec interrupt to transfer the bitstream to the RF frame transmit buffer and to transfer the second data from the RF frame receive buffer to the data communication interface, (k) a radio transceiver responsive to a first frame transmit interrupt to transmit first and second RF frames to a handset, the first and second RF frames including RF signals representing the bitstream, the radio transceiver receiving no RF frames between the transmission of the first and second RF frames, the radio transceiver responsive to a second frame transmit interrupt to transmit a third RF frame to the handset, the third RF frame including RF signals representing the first audio sample, the radio transceiver responsive to a first frame receive interrupt to receive fourth and fifth RF frames, the fourth and fifth RF frames including RF signals representing the second data, the radio transceiver transmitting no RF frames between the receipt of the fourth and fifth RF frames, the radio transceiver responsive to a second frame receive interrupt to receive a sixth RF frame, the sixth RF frame including RF signals representing the second audio sample, the first, second, third, fourth, fifth and sixth RF frames having the same duration; and (2) a handset having (a) an audio input, (b) an audio output, (c) a codec connected to the audio input and to the audio output, the codec responsive to a codec interrupt to generate the second audio sample from a voice signal received at the audio input, the codec responsive to the codec interrupt to generate a voice signal from the first audio sample, (d) a ROM, (e) a microcontroller, (f) a computer communication port, (g) a first data buffer, (h) a second data buffer, (i) a data_input routine comprising software instructions stored in the ROM, the software instructions executable by the microcontroller, the data_input routine responsive to a data_input interrupt to transfer into the first data buffer the second data received at the computer communication port, (j) an RF frame transmit buffer, (k) an RF frame receive buffer, (l) a sample transfer routine comprising software instructions stored in the ROM, the software instructions executable by the microcontroller, the sample transfer routine responsive to a third codec interrupt to transfer the second audio sample to the RF frame transmit buffer and responsive to a fourth codec interrupt to transfer the first audio sample from the RF frame receive buffer to the codec, (m) a data transfer routine comprising software instructions stored in the ROM, the software instructions executable by the microcontroller, the data transfer routine responsive to a fifth codec interrupt to transfer the second data from the first data buffer to the RF frame transmit buffer and responsive to a sixth codec interrupt to transfer the first data from the RF frame receive buffer to the second data buffer, (n) a data output routine comprising software instructions stored in the ROM, the software instructions executable by the microcontroller, the data output routine responsive to an output interrupt to transfer the first data to the computer communication port, (o) a radio transceiver responsive to a third frame transmit interrupt to transmit fourth and fifth RF frames to the base, the fourth and fifth RF frames representing the second data, the radio transceiver receiving no RF frames between the receipt of the fourth and fifth RF frames, the radio transceiver responsive to a fourth frame transmit interrupt to transmit the sixth RF frame, the sixth RF frame representing the second audio sample, the radio transceiver responsive to a third frame receive interrupt to receive the first and second RF frames representing the bitstream, the radio transceiver transmitting no RF frames between the receipt of the first and second RF frames, the radio transceiver responsive to a fourth frame receive interrupt to receive the third RF frame including RF signals representing the first audio sample. In one embodiment, the wireless voice and data communication system further comprises: (3) an RF channel interpreter comprising software instructions stored in the ROM of the base, the software instructions executable by the microcontroller of the base; (4) a data communication establishment routine comprising software instructions stored in the ROM of the handset, the software instructions executable by the microcontroller of the handset, the data communication establishment routine responsive to a data communication signal at the computer communication port to disable the sample transfer routine of the handset, to enable the data transfer routine of the handset, and to format a data communication command for transmission to the base; and (5) an RF frame including RF signals representing the data communication command transmitted from the radio transceiver of the handset and received by the radio transceiver of the base, the RF channel interpreter responsive to the data communication command to disable the sample transfer routine of the base, and to enable the data transfer routine of the base. In another embodiment, the wireless voice and data communication system further comprises: (6) a first burst comprising the first and second RF frames, the second RF frame including RF signals representing a number of data bits greater than the number of data bits represented by RF signals of the first frame, and (7) a second burst comprising the fourth and fifth RF frames, the fifth RF frame including RF signals representing a number of data bits greater than the number of data bits represented by RF signals of the fourth frame. In a still further embodiment the wireless voice and data communication system further comprises: (8) a change burst format command received at the computer communication port, the data_input routine responsive to the change burst format command to configure the handset to transmit seventh, eighth, and ninth RF frames including RF signals representing third data received at the computer communication port, the radio transceiver of the handset transmitting the seventh, eighth and ninth RF frames during a time period in which the radio transceiver of the handset receives no RF frames. In another embodiment, the wireless voice and data communication system further comprises: (9) a receive_burst routine comprising software instructions stored in the ROM of the base, the instructions executable by the microcontroller of the base, the receive_burst routine counting in a total_ bits_received variable, the number of bits represented in RF signals of RF frames received by the radio transceiver of the base; and (10) a transmit_burst routine comprising software instructions stored in the ROM of the base, the instructions executable by the microcontroller of the base, the transmit_ burst routine counting in a total_bits_transmitted variable, the number of bits represented in RF signals of RF frames transmitted by the radio transceiver of the base, the transmit burst routine comparing the total_bits_received and the total_bits_transmitted variables and, if the value of the total_bits_received variable is greater than the value of the total_bits_transmitted variable by more than a predetermined threshold, then the transmit_burst routine (1) configures the base to receive, during a time period in which the radio transceiver of the base transmits no RF frames, seventh, eighth, and ninth RF frames including RF signals representing third data received at the computer communication port of the handset, and (2) formats a first change burst format command to increase the number of RF frames transmitted by the handset during a time period in which the radio transceiver of the handset receives no RF frames, and if the value of the total_bits_transmitted variable is greater than the value of the total_bits_received variable by more than a predetermined threshold, then the transmit_burst routine (1) configures the base to transmit, during a time period in which the radio transceiver of the base receives no RF frames, seventh, eighth, and ninth RF frames including RF signals representing fourth data, and (2) formats a second change burst format command to increase the number of RF frames transmitted by the base during a time period in which the radio transceiver of the base receives no RF frames.

Another aspect of the present invention is a wireless voice and data communication system comprising: (1) means for inputting a voice signal; (2) means for transmitting a first RF frame representing the voice signal; (3) means for receiving an RF frame; (4) means for inputting a bitstream from a computer; and (5) means for transmitting second and third RF frames representing the bitstream during a time period in which the means for receiving an RF frame receives no RF frame.

BRIEF DESCRIPTION OF THE DRAWINGS

FIG. 1a illustrates a computer communication system of the prior art;

FIG. 1b illustrates components of a wireless computer communication system in accordance with one embodiment of the present invention;

DETAILED DESCRIPTION OF THE PREFERRED EMBODIMENT

Figure 1C:
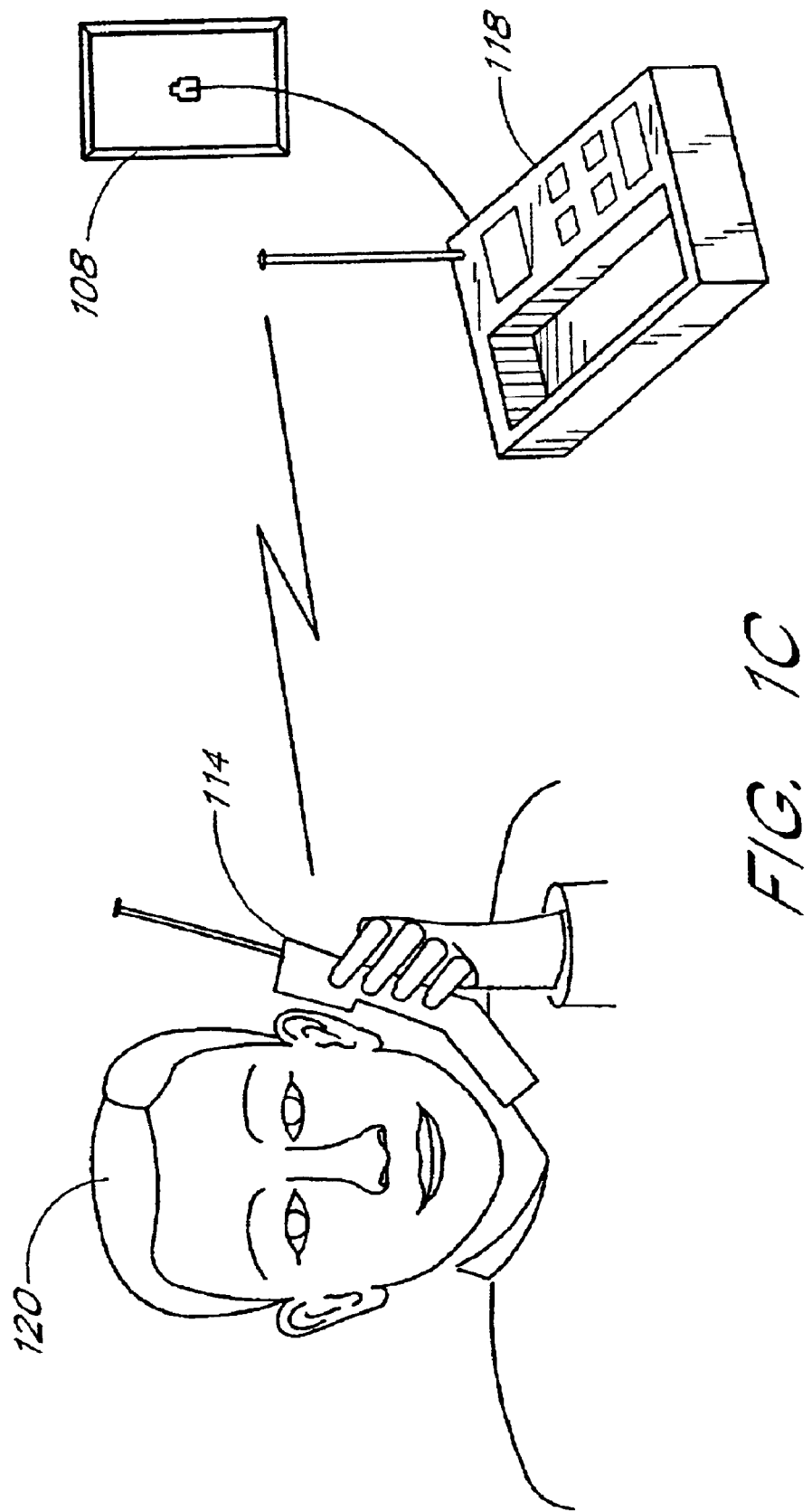
FIG. 1c illustrates components of a wireless voice-based communication system in accordance with one embodiment of the present invention.

FIG. 1a illustrates components of an existing computer communication system. Thus, a personal computer 102 is connected to a modem 104 by a cable 106. The modem 104, in turn, is connected to a standard RJ-11 telephone jack 108 by a standard telephone cord 110. The cable 106 is generally a serial cable connected from a serial port of the personal computer 102 to a serial port of the modem 104. In such systems, the personal computer 102 connects to remote computers by issuing call establishment commands to the modem 104 whereupon the modem 104 responsively dials the telephone number associated with the remote computer, and establishes communication parameters with a modem connected to the remote computer. The process of establishing communication parameters is called handshaking. When the handshaking is complete, the computer 102 directs the modem 104 to transmit data to the remote computer, and the personal computer 102 receives data transmitted by the remote computer to the modem 104.

While the computer communication system illustrated in FIG. 1a can be use to successfully communicate with remote computers, such as, for example, computers hosting Internet-based Web sites, such existing systems are inconveniently limited by the necessity of being very close to a standard telephone jack 108.

Today's computer users demand freedom to move from place-to-place with their computers. This can be seen from the dramatic success of laptop computers which are routinely under ten pounds in weight and run on battery power, thus avoiding any need for a power cord. Such laptop computers are easily toted by a user from place-to-place, affording maximum convenience in performing computer-related tasks. Even if the personal computer 102 happens to be a laptop computer, that convenience is lost when the user of the laptop computer 102 requires a data communication link to a remote computer. In that case, the laptop computer user, according to existing computer communication systems, must perform remote communication tasks at a location only a few feet from a standard telephone jack 108.

Moreover, when performing remote computer communication tasks in a household, computer users must often unplug their existing telephone from the telephone jack so that the modem 104 may be plugged in and used by the personal computer 102. To avoid that inconvenience, users often install a second and sometimes even a third telephone line within their homes to accommodate remote computer communications without having to disconnect a standard telephone.

FIG. 1b illustrates components of a wireless computer communication system in accordance with one embodiment of the present invention. FIG. 1b illustrates a personal computer 112 connected to a handset of a wireless telephone system by a cable 116. A base station 118 (or base) is connected to a standard RJ-11 telephone jack 108 by a telephone cord 110.

The wireless computer communication system illustrated in FIG. 1b eliminates any need for the user of a personal computer 112 to be located within a few feet of a standard telephone jack 108. Moreover, because standard voice-based telephone communications can be carried out using the handset 114 and the base 118, a wireless computer communication system illustrated in FIG. 1b advantageously allows either computer or voice communication to be conducted without ever unplugging a telephone from the telephone jack 108 and further without adding a second or third telephone line to a residence. As illustrated in FIG. 1c, a user 120 of the handset 114 conducts standard telephone conversations while the base 118 remains plugged into the standard telephone jack 108.

Data Format

Figure 2:
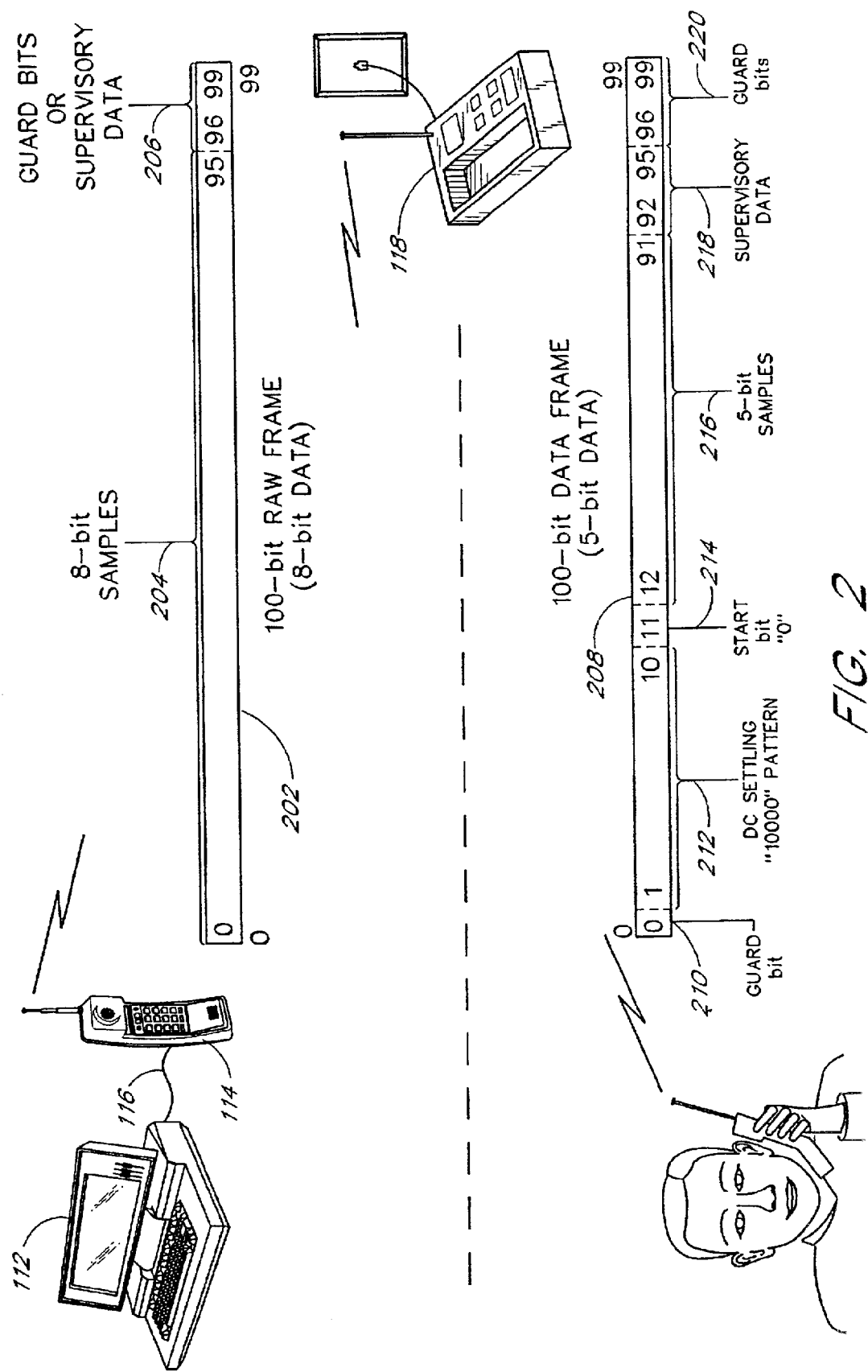
FIG. 2 illustrates wireless frame formats in one embodiment of the present invention.

FIG. 2 illustrates data frames used in performing computer or voice-based communications in accordance with one embodiment of the present invention. A personal computer 112 transmits data to the handset 114 via the cable 116. The handset 114 formats the data into one or more 100-bit raw frames 202 which are transmitted as radio signals by the handset 114 to the base 118. The raw frames 202 are transmitted in groups called bursts. Each burst is preceded by a data frame 208 (discussed below). A settling pattern of a data frame corresponds with a time duration sufficient for the base 118 to switch the mode of its radio to receive mode.

Because the remote communications performed by the personal computer 112 may be two-way communications, the base 118 receives data from a remote computer over a telephone link, formats that data into 100-bit raw frames, and transmits the 100-bit raw frames as radio signals to the handset 114 which, in turn, communicates data extracted from the 100-bit raw frames 202 to the personal computer 112 over the cable 116. Like the handset 114, the base 118 precedes each transmission of a burst of raw frames with a data frame 208 having a settling pattern to allow the receiving radio time to change modes.

In accordance with one embodiment of the present invention, the 100-bit raw frame is formatted to carry 96 bits (bits 0-95) of data 204, preferably divided into 8-bit bytes. Thus, each 100-bit raw frame 202 can hold 12 8-bit data bytes. In addition, each 100-bit raw frame 202 includes 4 bits (bits 96-99) of either supervisory data or guard bits 206. While it will be clear to those of ordinary skill in the art that the 4 bits of supervisory data 206 could be located anywhere within the 100-bit raw frame 202, in the preferred embodiment of the 100-bit raw frame 202, the supervisory data (or guard bits if the raw frame is the last raw frame of a burst) are organized as the last 4 bits of the 100-bit raw frame 202. The 100 bits of the last raw frame of a burst are allocated slightly differently in that the last 4 bits are allocated as guard bits, rather than supervisory channel bits.

Advantageously, another 100-bit frame, called a data frame 208, is used to conduct voice-based communications. Thus, the handset 114 converts voice signals into 100-bit data frames 208 and transmits the 100-bit data frames 208 as radio signals to the base 118, which recreates voice signals from the data frames and transmits the voice signals over a telephone link to a remote telephone user. Supporting two-way voice communication, the base 118 receives voice signals over a telephone line, converts those voice signals into one or more 100-bit data frames 208, and transmits the 100-bit data frames 208 as radio signals to the handset 114. The handset 114 receives the 100-bit data frames, converts the data frames 208 into analog sound signals, and generates sound waves using a speaker in the handset 114.

The 100-bit data frame is organized to contain guard bits, settling bits, start bits, 5-bit samples, and supervisory data. While it will be appreciated by one of ordinary skill that more or fewer bits could be allocated to each of those categories and those categories could be arranged in a variety of locations within the 100-bit data frame 208, in a preferred embodiment of the 100-bit data frame 208, a first bit at location zero is a guard bit 210, the next 10 bits are allocated for a settling pattern 212, the settling pattern is followed by a single start bit 214, the next 80 bits are divided into 16 5-bit samples 216, the next 4 bits are allocated for supervisory data bits 218, and the last 4 bits are allocated for guard bits 220. The supervisory channel allows for background communication, such as state changes, between the handset 114 and the base 118. As will be readily understood by those of ordinary skill, the guard bits correspond to a duration of time that allows for wireless link path delay between the handset 114 and the base 118.

The present invention, in one embodiment, performs data communication by transmitting one 100-bit data frame 208 and one 100-bit raw frame 202 each 4 milliseconds, easily permitting the personal computer 112 to communicate with a remote computer at a rate of 33,600 bits per second. It will be appreciated by those of ordinary skill that higher rates can be supported, depending upon the design of the wireless radio link in the handset 114 and the base 118. Thus, the present invention is in no way limited by any data rate.

The handset 114 and base 118 of the present invention advantageously exchange frames differently depending on whether voice or data communication is being supported. In accordance with one embodiment, when the present invention supports data communication, the handset 114 and base 118 exchange frames in the following sequence:

1. Handset transmits one data frame, Base receives the data frame
2. Handset transmits one raw frame, Base receives the raw frame
3. Base transmits one data frame, Handset receives the data frame
4. Base transmits one raw frame, Handset receives the raw frame As will be more fully explained below, the technique of transmitting at least two frames sequentially in each direction advantageously allows a greater number of bits per time period to be allocated to data, achieving greater efficiency in the available bandwidth.

When supporting voice communication, the handset 114 and base 118 exchange frames in a different sequence as follows:

1. Handset transmits one data frame, Base receives the data frame
2. Base transmits one data frame, Handset receives the data frame
3. Handset transmits one data frame, Base receives the data frame
4. Base transmits one data frame, Handset receives the data frame By alternating transmission of single frames in voice mode, the handset 114 and base 118 advantageously avoid any significant delay to voice signals, and also reproduce the user's own voice at the output speaker of the handset 114 (i.e., provide a feedback feature) so quickly that the user perceives little, if any, delay, advantageously avoiding an annoying echo effect.

Hardware Configuration

Figure 3:
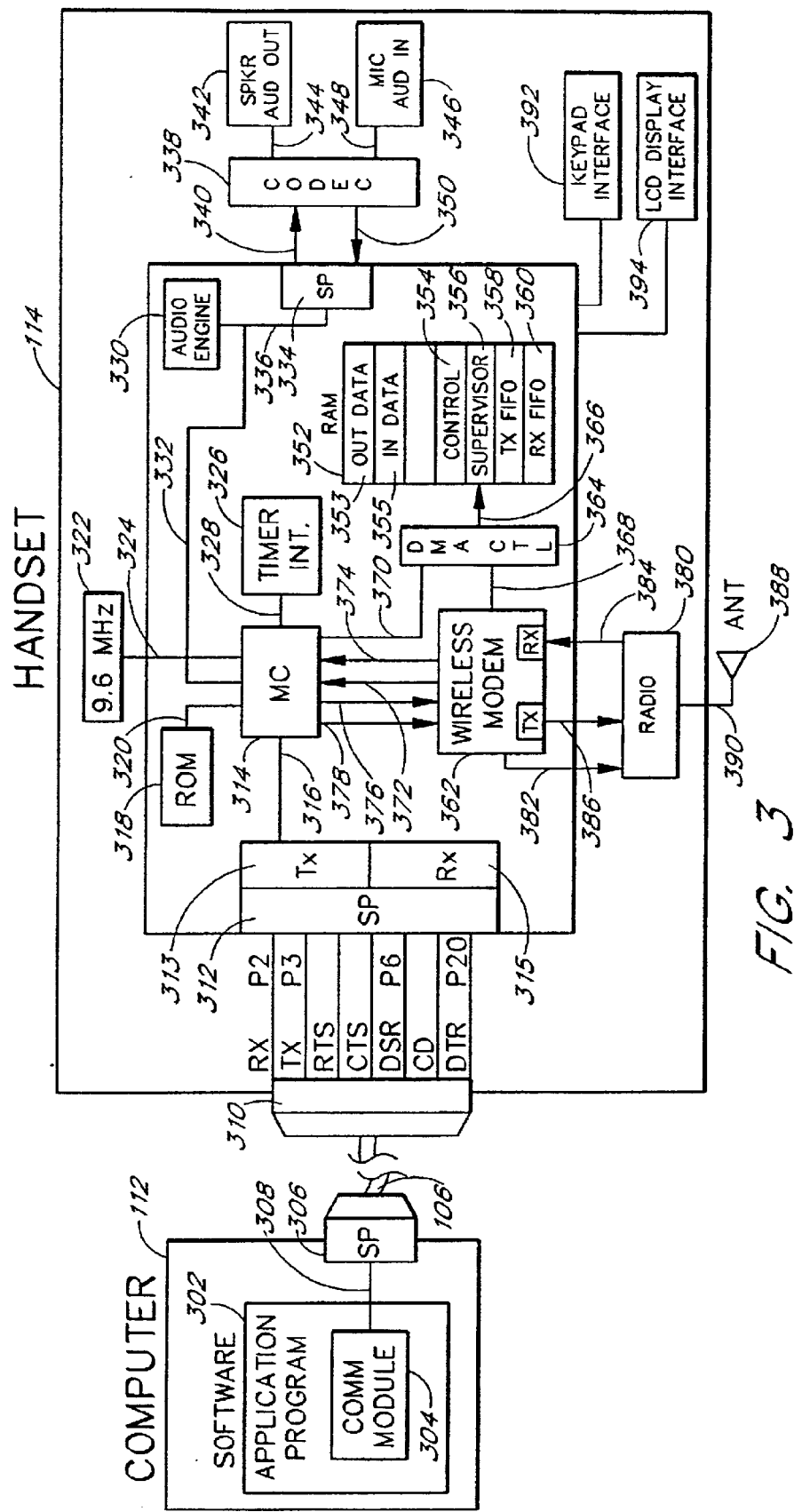
FIG. 3 illustrates components of a computer and components of a handset of a wireless voice and data communication system in accordance with an embodiment of the present invention.

FIG. 3 illustrates a computer 112 connected by a cable 106 to a handset 114 in accordance with one embodiment of the present invention. Software running on the computer 112 includes an application program 302 having a communication module 304 that initiates, controls or supports communication with a remote computer (not pictured). It will be understood by those of ordinary skill that the communication module 304 communicates with a serial port 306 of the computer 112 through a bus 308. One example of such a serial port is included in the popular class of personal computers having an Intel (or Intel compatible) processor and running the Windows 3.1 or Windows 95 operating system produced by Microsoft Corporation, which computers generally designate such serial ports as COM1 or COM2.

The computer 112 exchanges communication signals with the handset 114 through the serial cable 106. One end of the serial cable 106 connects to the serial port 306 of the computer 112. The other end of the serial cable 106 connects to a data serial port 310 of the handset 114. The data serial port 310 of the handset 114 is connected to a data serial port controller 312. The data serial port controller 312 preferably includes asynchronous receive/transmit capability and performs serial-to-parallel conversion on incoming data received through the data serial port 310 and also performs parallel-to-serial conversion on outgoing data received through the data serial port controller 312. The data serial port controller 312 also preferably double-buffers data in transmit and receive shift registers.

A serial port transmit buffer 313 and a serial port receive buffer 315 are connected to the data serial port controller 312. In a preferred embodiment, the serial port transmit and receive buffers 313, 315 are UART FIFO buffers capable of holding 16 bytes. The data serial port controller 312 places bytes received over the serial port 310 into the serial port receive buffer 315, and retrieves bytes from the serial port transmit buffer 313 and transmits the bits of each retrieved byte to a pin of the serial port 310.

A microcontroller 314 reads data signals from and writes data signals to the data serial port controller 312 over a line 316. The microcontroller 314 reads data from a read only memory (ROM) 318 over a line 320. A 9.6 MHz clock 322 times the microcontroller over a line 324. A timer/interrupt module 326 controls and supports both timed and interrupt-driven events to be serviced by the microcontroller 314. The timer/interrupt module 326 is connected to the microcontroller 314 by a line 328.

An audio engine 330 decodes voice samples received from the microcontroller 314 over a line 332 and encodes voice samples received from a voice serial port 334 over a line 336. A codec 338 processes decoded audio sample data received over a line 340, and converts those samples into output-ready analog audio signals for reproduction by a speaker/audio output 342 (or transmission to an audio output line) which receives the samples over a line 344. The codec 338 also samples analog voice signals received from a microphone/audio input 346 over a line 348. The codec 338 converts to digital the analog signals received from the microphone 346 and makes the converted signals available on the voice serial port 334 over a line 350.

A random access memory (RAM) 352 includes an outgoing data buffer 353, an incoming data buffer 355, a control data buffer 354, a supervisory data buffer 356, a modem transmit buffer (TX FIFO) 358, and a modem receive buffer (RX FIFO) 360. The outgoing data buffer 353 buffers data that is to be sent from the handset 114 to the base 118, and the incoming data buffer 355 buffers data received from the base 118 that is to be transmitted to the computer 112. The modem transmit buffer 358 buffers bits that comprise the information in a frame to be transmitted to the base 118 in RF signal form. The modem receive buffer 360 stores bits representing an RF frame received from the base 118.

A wireless modem 362 writes data to and reads data from the RAM 352. A DMA controller 364 governs access to the RAM 352 generally by giving priority to the wireless modem 362 over the microcontroller 314 which also writes to and reads data from the RAM 352. The DMA controller 364 transfers data to and from the random access memory 352 over a line 366. The wireless modem 362 transmits to or receives data from the DMA controller 364 over a line 368. The microcontroller 314 transmits data to and receives data from the DMA controller 364 over a line 370.

The wireless modem 362 generates a transmit end of frame (END_OF_FRAME_TX) interrupt signal which is propagated to the microcontroller 314 over a line 372. The END_OF_FRAME_TX interrupt is generated at predetermined time intervals by a time-division duplex controller included in the wireless modem 362. Counters in the wireless modem 362 keep track of bit and frame timing. A receive end of frame interrupt (END_OF_FRAME_RX) is generated by the wireless modem 362 and propagated to the microcontroller 314 over a line 374. The microcontroller 314 generates a 2-bit signal which is propagated over a line 376 enabling either transmit or receive processing by the wireless modem 362. Typically, transmit and receive are not enabled during the same frame. Also, the microcontroller 314 generates a multi-bit signal, in one embodiment a 4-bit frame format signal, indicating a frame format (e.g., raw or data) to employ in subsequent communication, and propagates that signal over a line 378 to the wireless modem 362.

A radio transceiver 380 (radio) either receives or transmits data frames, depending on a transmit/receive signal (tx enable in one state, rx enable in another state), in one embodiment a 1-bit signal, generated by the wireless modem 362 and propagated to the radio 380 over a line 382. Data received by the radio 380 is propagated to the wireless modem 362 over a line 384. The radio 380 transmits data received from the wireless modem 362 over a line 386. The radio 380 receives and transmits analog signals over an antenna 388 connected to the radio 380 by a line 390.

The microcontroller 314 also communicates with a numeric keypad (not pictured) through a keypad interface 392. Additionally, the microcontroller 314 communicates with an LCD display (not pictured) by way of an LCD display interface 394.

In another embodiment (not pictured), the components described above in relation to FIG. 3 are included on a computer circuit board, such as an expansion card. It will be understood that, in that embodiment, (1) the data serial port 310 is replaced with a computer bus interface, (2) the speaker/audio out 342 is replaced by a computer speaker or sound card, and (3) the microphone/audio in 346 is replaced by a microphone interfaced to the computer such as one connected to a sound card. Software instructions of the application program 302 route the microphone signals to the line 348 via the computer bus and, also via the computer bus, route analog audio output signals from the line 344 to the computer speaker or sound card. A user interface generated by additional software instructions of the application program 302 prompts users for dialing information, accepts telephone number information, and routes that information to the keypad interface 392. Thus, in one embodiment of the present invention, a user may engage in voice and data communications using the computer 112 with the expansion card and base 118 of the present invention.

Figure 4:
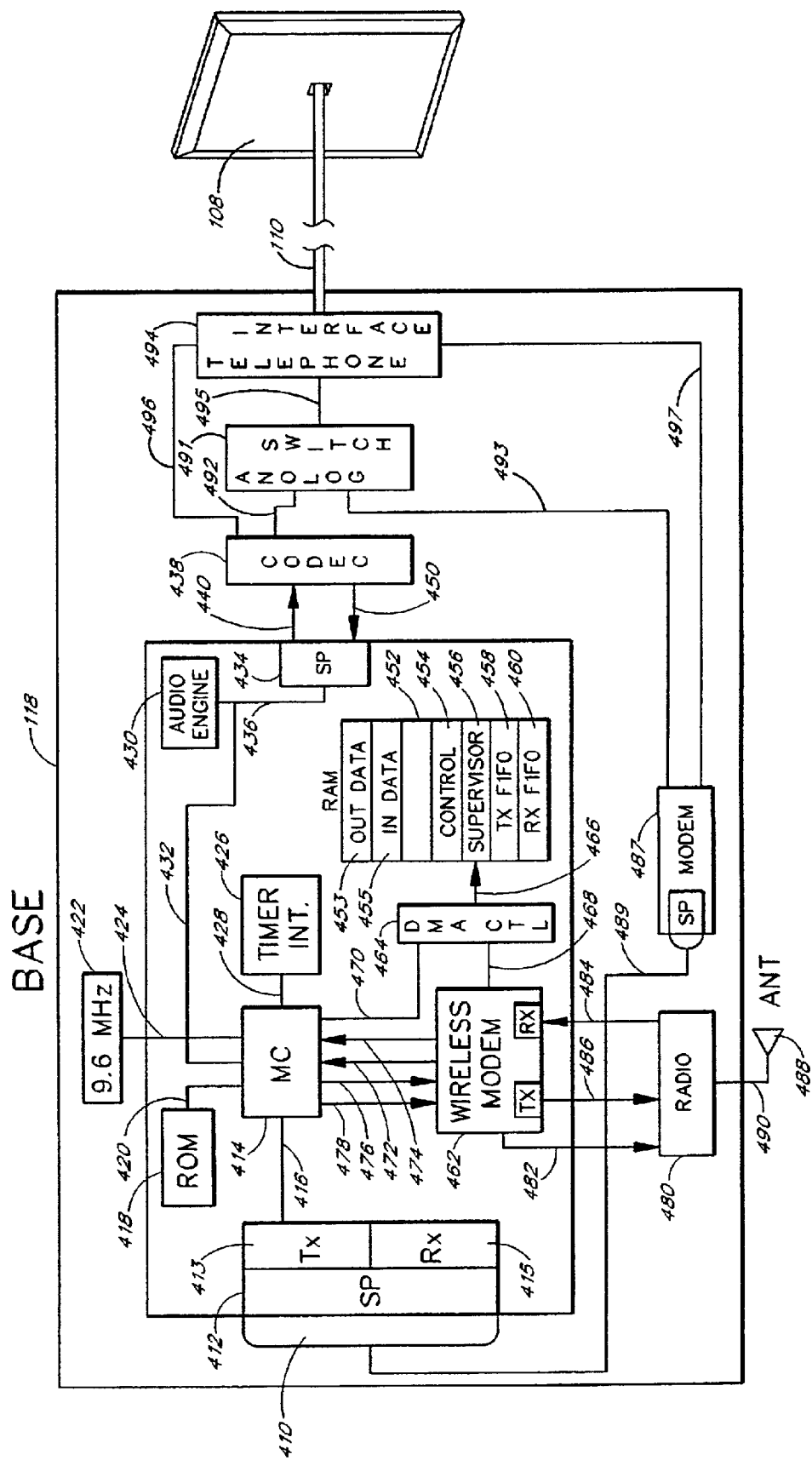
FIG. 4 illustrates components of a base of a wireless voice and data communication system in accordance with an embodiment of the present invention.

FIG. 4 illustrates a base 118 which communicates with the handset 114 by transmitting and receiving radio signals. Because the base 118 receives and transmits radio signals in the same manner as the handset 114, many of the components of the base 118 are similar to those of the handset 114. Thus, the microcontroller 414 reads data from a read only memory (ROM) 418 over a line 420. A 9.6 MHz clock 422 times the microcontroller 414 over a line 424. A timer/interrupt module 426, connected to the microcontroller 414 by a line 428, controls and supports both timed and interrupt-driven events that are serviced by the microcontroller 414.

Additional components of the base 118 that are similar to those of the handset 114 include an audio engine 430 which decodes voice samples received over a line 432 from the microcontroller 414, and also encodes voice samples received over a line 436 from a voice serial port 434. A codec 438 processes decoded audio sample data received over a line 440. Also, the codec 438 samples analog voice signals and converts to digital, the analog, signals which it makes available on the voice serial port 434 over a line 450.

The microcontroller 414 receives signals from and transmits signals to a data serial port controller 412 over a line 416. The data serial port controller 412 includes the characteristics of the handset data serial port controller 312. A serial port transmit buffer 413 and a serial port receive buffer 415 are connected to the data serial port controller 412.

The microcontroller 414 also reads data from and writes data to a random access memory (RAM) 452. The RAM 452 includes an outgoing data buffer 453 that stores bytes to be transmitted to the handset 114, an incoming data buffer 455 that stores bytes received from the handset 114, a control buffer 454, a supervisory buffer 456, a modem transmit (TX FIFO) buffer 458, and also includes a modem receive buffer (RX FIFO) 460. A DMA controller 464 governs access to the RAM 452 by both the microcontroller 414 and the wireless modem 462. The DMA controller 464 exchanges data with the RAM 452 over a line 466. The wireless modem 462 exchanges data with the RAM 452 over a line 468, and the microcontroller 414 exchanges data with the RAM 452 over a line 470.

A time-division duplex controller in the wireless modem 462 generates a transmit end of frame (END_OF_FRAME_TX) interrupt signal and a receive end of frame (END_OF_FRAME_RX) interrupt signal, which signals are propagated respectively to the microcontroller 414 over lines 472 and 474. The microcontroller 414 generates a 2-bit signal to the wireless modem 462 over a line 476, the 2-bit signal enabling transmit and/or receive processing by the wireless modem 462. Typically, only one mode of processing is enabled at any time. The microcontroller 414 also generates a multi-bit (e.g., a 4-bit) frame format signal, propagated to the wireless modem 462 over a line 478, indicating a frame format to use in organizing data for subsequent communication.

A transmit/receive signal (tx enable, rx enable) of at least 1 bit, generated by the wireless modem 462 and propagated to a radio transceiver 480 (radio) over a line 482, causes the radio 480 to either transmit or receive data. Specifically, the radio 480 receives data from the wireless modem 462 over a line 486 and transmits the signals via an antenna 488 connected to the radio by a line 490. The radio 480 receives signals via the antenna 488 and transmits data to the wireless modem 462 over a line 484.

In one embodiment of the present invention, the base 118 includes a modem circuit 487 which receives data from and transmits data to the data serial port controller 412 over a line 489. In a preferred embodiment, the modem 487 is an ASIC (application specific integrated circuit) having a serial interface including (1) a TXD line on which the modem 487 receives data to be transmitted from the computer 112; (2) a RXD line on which the modem receives data from a remote computer to be transmitted to the local computer 112; (3) a RTS (Request To Send) line which, if active (high), indicates a query by the computer 112 to determine whether the modem 487 is available to transmit data to a remote computer, and, if inactive (low), indicates that the computer 112 is too busy to receive data and that the modem 487 should stop sending data to the computer 112; (4) a CTS (Clear To Send) line which, if active (high) represents a signal by the modem 487 that transmission of data to a remote computer can proceed and, if inactive (low), indicates that the local computer 112 is sending data too fast and should stop transmitting data to the modem 487 until the CTS signal is active; and (5) a CD (Carrier Detect) or RLSD (Received Line Signal Detect) line which, if active, indicates that the modem 487 has established a data communication link to another computer. The modem 487 permits basic modem data pump and digital signal processing capabilities and also preferably complies with recommendations set by CCITT V series standards, including V.17, V.27, V. 29 and V.33.

In addition, the modem 487 provides an OH (off-hook relay control) signal, such as a signal sufficient to drive a 5 V relay coil where OH active closes the relay to connect the modem 487 and the telephone line 110. The modem 487 also includes a RD (ring detect) signal that is set active when the modem detects a valid ringing signal on the telephone line 110.

An analog switch 491 is connected to the modem 487 by a line 493. The analog switch 491 is also connected to the codec 438 by a line 492. The analog switch 491 connects to a telephone interface 494 by a line 495. The telephone interface 494 includes a hook relay (not pictured) to open, initiate and close telephone-based communications. The telephone interface 494 connects to the codec 438 by a line 496. A line 497 connects the modem 487 to the telephone interface 494. The telephone interface 494 is connected to the RJ-11 telephone jack 108 by the standard telephone cord 110.

As will be understood by those of ordinary skill in the art, the functions of the modem 487 could be carried out by the microcontroller 414 executing appropriate software instructions stored either in RAM 452 or ROM 418. In such an embodiment, software instructions scan and demodulate signals from a telephone line, and also scan and modulate bitstreams generated by a computer and transmitted over a wireless link. Such software instructions also control flow of data and instruct the microcontroller to generate flow control commands to be transmitted to the handset 114 or on the telephone line 110.

Generally, communication, both voice and data, is achieved by the handset 114 and the base 118 according to software instructions executed by respective microcontrollers 314, 414. Because of some overlap in function, the software, grouped into particular modules, is similar on both the handset 114 and the base 118, preferably residing in respective ROMs 318, 418. One of ordinary skill will understand that the software modules could also be stored in respective RAMs 352, 452. Accordingly, the handset 114 and the base 118 use substantially the same underlying software architecture.

Software Architecture

Figure 5:
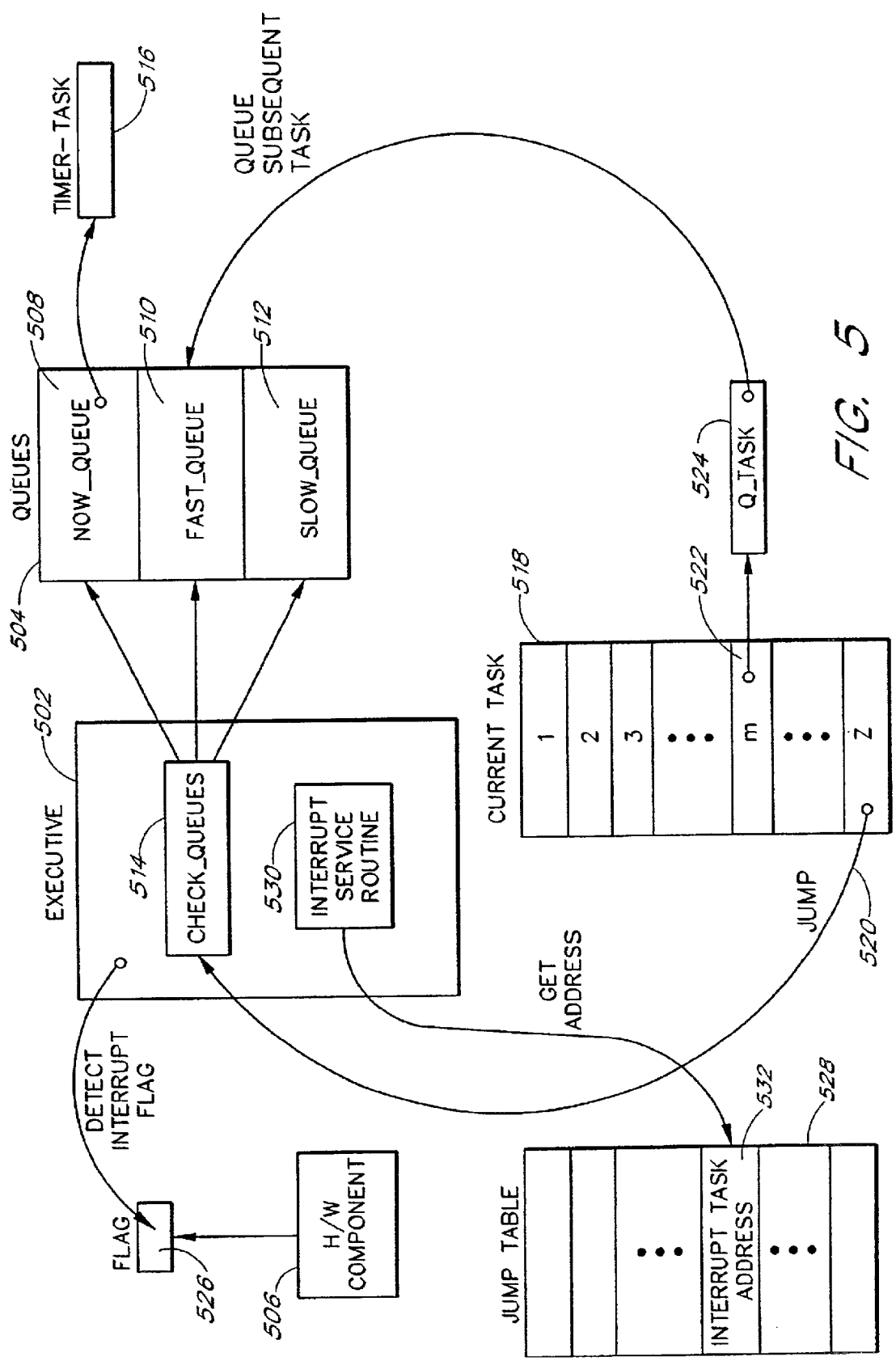
FIG. 5 illustrates a software architecture of a handset or base of a wireless voice and data communication system in one embodiment of the present invention.

FIG. 5 illustrates one embodiment of an underlying software architecture used by the handset 114 and the base 118. An EXECUTIVE module 502 prioritizes the execution of individual tasks by managing three queues 504. The EXECUTIVE 502 also services interrupts generated by particular hardware components 506 of the handset 114 and the base 118.

The EXECUTIVE 502 maintains a three-level queuing system. First, the EXECUTIVE 502 maintains a NOW_QUEUE 508 which references the highest priority tasks to be completed. In a preferred embodiment, tasks referenced in the NOW_QUEUE must complete within 0.05 msec. Second, the EXECUTIVE 502 maintains a FAST_QUEUE 510. Tasks referenced in the FAST_QUEUE are of the next highest priority and, in a preferred embodiment, must complete within 2 msec. Finally, the EXECUTIVE 502 manages a SLOW_QUEUE 512 which contains references to tasks having lower priority in the system and, in a preferred embodiment, the tasks in the SLOW_QUEUE 512 must complete within 20 msec. As used herein, the terms task, routine, and module refer generally to grouped software instructions having entry and exit points.

To process the tasks in the queues 504, the EXECUTIVE 502 executes a CHECK_QUEUES routine 514. The CHECK_QUEUES routine 514 examines the queues 504 in order of priority and, generally, executes the first encountered queued task having the highest priority. Thus, the CHECK_QUEUES routine 514 first examines the NOW_QUEUE 508 and executes any task referenced in the NOW_QUEUE 508 before any task referenced by the FAST_QUEUE 510 or the SLOW_QUEUE 512. In a preferred embodiment of the present invention, a TIMER_TASK 516, responsible for queuing other tasks to be run at predetermined time intervals, is the only task referenced by the NOW_QUEUE 508. The CHECK_QUEUES routine 514 next examines the FAST_QUEUE 510 for any tasks referenced, and schedules for execution the first task encountered as long as no task having a higher priority appears in the NOW_QUEUE 508. Finally, the CHECK_QUEUES routine 514 examines the SLOW_QUEUE 512 for any tasks having lower priority in the system, and schedules for execution the first encountered task in the SLOW_QUEUE 512 as long as no higher priority tasks exist in either the NOW_QUEUE 508 or the FAST_QUEUE 510. In a preferred embodiment of the present invention, each queue is implemented as a list of subroutine addresses within in a single queue table, and each particular queue is referenced by an index or pointer (Q_Now, Q_Fast, Q_Slow) into the queue table. Thus, in that embodiment, the CHECK_QUEUES routine 514 first checks for and executes a task referenced by the Q_Now index, then, if none exist, checks for and executes a task referenced by the Q_Fast index, and, finally, if no tasks are referenced by the Q_Now or Q_Fast indexes, the CHECK_QUEUES routine 514 checks for and executes a task referenced by the Q_Slow index.

Generally, the three-level queuing system operates by continually checking the queues 504 for particular tasks that need to be executed. Any task currently running 518 performs a series of subtasks, as needed, and, upon completion, executes a jump instruction 210 to the CHECK_QUEUES routine 514 which then searches the queues 504 for the next task to execute. Often, a currently executing task 518 queues another, subsequent task to be executed upon its own completion. Thus, as one of its subtasks, a currently executing task 518 performs a call instruction 522 to call a Q_TASK routine 524 which queues a task into one of the three queues for subsequent execution by the EXECUTIVE 502.

Certain tasks, however, are not executed by being placed in the queues 504. Rather, in certain states of operation of the present invention, a hardware component will detect an important event which needs immediate processing. Thus, a hardware component 506 generates an interrupt (e.g., by setting an interrupt flag) which is immediately detected by the EXECUTIVE 502. Upon detecting the setting of the interrupt flag 526, the EXECUTIVE 502 suspends the execution of any current task 518, and initiates an INTERRUPT_SERVICE_ROUTINE 530 that schedules the execution of an interrupt-driven task.

More specifically, the INTERRUPT_SERVICE_ROUTINE 530 associates a unique index value with the interrupt flag 526 and uses the index value as an index to a jump table 528. The index value represents an offset (e.g., a number of fixed-bit-length memory addresses) from the beginning of the jump table 528, and the INTERRUPT_SERVICE_ROUTINE 530 retrieves an interrupt task address 532 (i.e., the address of the task to be executed to properly handle the interrupt) at the offset location and schedules execution of the interrupt task, in one embodiment, by copying the interrupt task address 532 into one of the queues 504.

Once the INTERRUPT_SERVICE_ROUTINE 530 completes, the EXECUTIVE 502 resumes processing of the suspended task. In a preferred embodiment of the present invention, all interrupt-driven tasks must complete within 30 msec. It will be appreciated by those of ordinary skill that one function of an interrupt-driven task could be to queue a task in one of the three queues 504. The present invention, thus, provides a Q_TASK_INT routine which queues a task into one of the three queues 504 from an interrupt routine.

Establishing Voice Communication Link

Figure 6:
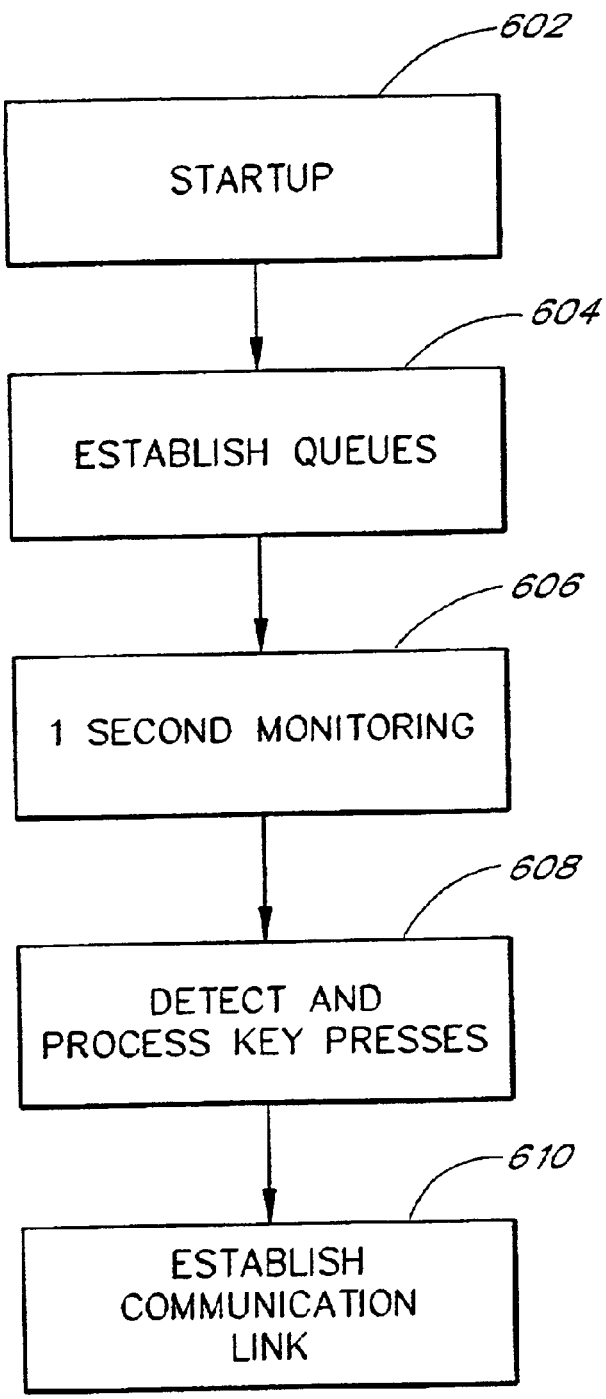
FIG. 6 illustrates startup steps of a wireless voice and data communication system in accordance with an embodiment of the present invention.

FIG. 6 illustrates steps performed to establish a voice communication link using the handset 114 and the base 118 of the present invention. In a first step 602, a start-up sequence is executed in response to powering on the base 118 and the handset 114. In a preferred embodiment, the particular steps carried out by the start-up routine include:

disabling interrupts;

initializing the microcontroller stack;

powering up ASIC (Application-Specific Integrated Circuit) hardware;

initializing jump tables;

setting microcontroller speed;

setting RAM wait states to zero;

performing internal ROM check;

checking RAM and initializing RAM to zero;

calibrating timers;

initializing RAM with default ROM values;

initializing speaker phone;

initializing codec;

signaling results of RAM and ROM tests via LEDs; and loading and initializing the EXECUTIVE 502.

install data frame processing tasks (placing addresses of CODEC_AE_TRANSFER task and TRANSMIT_DATA_FRAME task in jump table 528 to execute respectively upon CODEC and END_OF_FRAME_TX interrupts)

In a next step 604, the queues 504 are established and initial tasks are placed within the queues. At this point, the TIMER_TASK 516 is queued to the NOW_QUEUE 508, and a TWENTYMS_TIMER_TASK is queued to the SLOW_QUEUE 512. Once the start-up routine is completed, the EXECUTIVE 502 is loaded and running, and the queues are established—events which occur in both the handset 114 and the base 118—then the handset 114 and base 118 are ready to communicate.

In a step 606, the handset 114 performs one second monitoring. Thus, when inactive, the handset 114 enters an idle state wherein minimal processing is performed. The duration of this idle state, in a preferred embodiment, is one second. But it will be clear to those of ordinary skill in the art that durations of more or less than one second could be used. In the step 606, the handset 114 emerges from the idle state once per second to transmit a check or heartbeat signal to the base 118, and to perform the TWENTYMS_TIMER_TASK.

In particular, when the handset 114 emerges from its idle state, the base 118 is in a receive state, waiting to receive an ID frame. The handset 114 initializes transmission counters and timers and transmits a predetermined ID frame, including ID information. The base 118 receives the ID frame, and receive logic in the base 118 locks onto the ID frame. The receive logic in the base 118 then synchronizes its receive counters and timers with the transmit counters and timers of the handset 114. The base 118 initializes its transmit counters and timers and then transmits an ID frame, and receive logic in the handset 114 locks onto the ID frame and initializes its receive counters and timers with the transmit counters and timers of the base 118. The handset 114 and the base 118 thus establish a wireless link. The handset 114 may also transmit a data frame 208 to the base 118 including bits in the supervisory channel indicating a frame format protocol. The frame format protocol indicates the order and type of frames that the handset 114 and base 118 will exchange during communication. The handset 114 and base 118 use the indicated protocol as the active frame format protocol.

Once the timers, in one embodiment TDD timers, have been initialized and synchronized, the respective wireless modems 362, 462 generate events based on bit time (duration preceding and including the transmission of the nth bit of 100 bits in a frame) within a frame. For example, the wireless modems 362, 462 generate END_OF_FRAME_TX and END_OF_FRAME_RX interrupts respectively after bit time 95 of a transmit frame and after bit time 95 of a receive frame.

Once a wireless link has been established, the TWENTYMS_TIMER_TASK monitors user activity, including scanning for key presses by the user of keys on the handset keypad. If, in the step 606, the TWENTYMS_TIMER_TASK routine detects no key press, than the handset 114 again enters an idle state and the one second monitoring repeats.

If, however, a user presses a key on the handset keypad, then, in a step 608, the handset 114 detects and processes a key press. In one embodiment of the present invention, the TWENTYMS_TIMER_TASK detects a key press and schedules a KEYPAD_INTERPRETER for execution on the FAST_QUEUE 510. Thus, the KEYPAD_INTERPRETER is invoked by the TWENTYMS_TIMER_TASK when a user presses a key on the keypad.

In one embodiment of the present invention, each key press is interpreted by the KEYPAD_INTERPRETER into a key code. The key codes are grouped into three categories: (1) dialing keys; (2) state change keys; and (3) local function keys. While it will be understood that other groupings or categories of key codes could be used, the dialing keys include key codes that cause dialing and result in dial information being sent from the handset 114 to the base 118. After a key press is detected, the KEYPAD_INTERPRETER schedules the TWENTYMS_TIMER_TASK for execution and then jumps to the CHECK_QUEUE routine 514. The CHECK_QUEUE routine 514 scans the queues 504, encounters the TWENTYMS_TIMER_TASK, and executes it. Thus, the handset 114 becomes active and does not return immediately to the idle state.

As key presses are detected by the KEYPAD_INTERPRETER, the handset 114 transmits information to the base using the supervisory data bits 218 in a series of 100-bit data frames 208. A supervisory channel, in one embodiment, is structured to have a 12-bit word, comprising an 8-bit data byte, followed by a 4-bit control sequence. In one embodiment, the 8-bit data byte is allocated to have a 3-bit data type field which define the type of data (e.g., command or digit) in the word and a 5-bit data value corresponding to a data value (e.g., a particular command or digit). Control sequence bits include parity information. The 12-bit word is sent from the handset 114 to the base 118, 4 bits per 100-bit data frame 208, and is repeated at least three times until the handset 114 receives an acknowledgment from the base 118.

The supervisory channel link is active whenever the radio link is active. If there is no activity requiring data to be transmitted over the supervisory channel, the handset 114 sends a signal (such as, for example, a KEY_RELEASE signal) which causes no activity in the base 118, and the base 118 sends a NULL command (which likewise causes no activity in the handset 114) to the handset 114 in response. Thus, data frames 208 are exchanged even though the supervisory channel is unused.

The supervisory channel, to which is allocated only a small percentage of data frame 208 bits, is thus a low bit-rate channel used for sending certain types of data between the handset 114 and the base 118. In a preferred embodiment, the handset sends link establishment and dialing data over the supervisory channel in response to user interaction with the handset keypad.

Users generally initiate a telephone call by pressing a PHONE key on the handset keypad. The KEYPAD_INTERPRETER interprets that key press into a key code, and schedules a SEND_COMMAND routine for execution. The SEND_COMMAND formats supervisory channel bits to send an off-hook command to the base 118. Thus, the SEND_COMMAND routine encodes a value representing the off-hook command in the 5-bit data value field of the supervisory channel, and also sets the 3-bit data type field to indicate that a command is being sent.

A supervisory channel interpreter executes on the base 118 in response to each END_OF_FRAME_RX interrupt generated by the wireless modem 462. The supervisory channel interpreter recognizes the off-hook command and schedules an OFF_HOOK routine for execution. The OFF_HOOK routine controls the hook relay in the telephone interface 494 and uses either tone dialing or pulse dialing as indicated by the states of two 1-bit global flags allocated in the RAM 452, one for tone mode and the other for pulse mode. The OFF_HOOK routine causes the hook relay in the telephone interface 494 to go off-hook, and also sets to 1 the value of a global flag called the VOICECOM flag allocated in the RAM 452. The VOICECOM flag, when set to 1, indicates that the handset 114 and the base 118 are presently supporting voice communications.

Global flags (flags used by both the handset 114 and the base 118 to control states of communication processing) such as the pulse or tone flags may be set or cleared by routines executing on the handset 114 or on the base 118. Generally, such a routine sets the value of the flag on the local component (e.g., the base 118) and sends a command over the supervisory channel to set the same global flag to the same value on the remote component (e.g., the handset 114). To send global flag information to the remote component, the 8-bit data byte of the supervisory channel is allocated to have 3 bits representing a particular bank or set of global flags, and the remaining 5 bits of the 8-bit data byte represent the value of five particular global flags. The four-bit control value corresponds to a command indicating that global flags be set.

Thus, the OFF_HOOK routine running on the base 118 sets to 1 the VOICECOM flag on the base 118 and uses the supervisory channel to cause the handset 114 to set to 1 its own VOICECOM flag allocated in the RAM 352. The OFF_HOOK routine also sets to 0 a DATACOM flag (indicating whether the handset 114 and base 118 are presently supporting data communication), and uses the supervisory channel to cause the handset 114 to set to 0 the value of the DATACOM flag of the handset 114.

When the hook relay in the telephone interface 494 goes off-hook, the handset 114 and the base 118 begin exchanging data frames 208 including data representing audio signals sampled by the respective codecs 338, 438. The user, at the handset, thus begins to hear the dial tone generated on the telephone line 110.

The user then dials a telephone number. As each digit key is pressed, the handset 114 sends corresponding digit information to the base 118 over the supervisory channel. In a preferred embodiment of the present invention, the handset 114 transmits dialing digits to the base 118, and the base 118 makes the decision when to dial the telephone number and establish the connection. Once the base 118 receives all the dialing digits, a COMBO task is scheduled for execution by the base 118. In a step 610, the COMBO task dials the number indicated by the dialing digits, and establishes a voice communication link upon a remote telephone system answering the call.

Processing Voice Communication Signals

Figure 7:
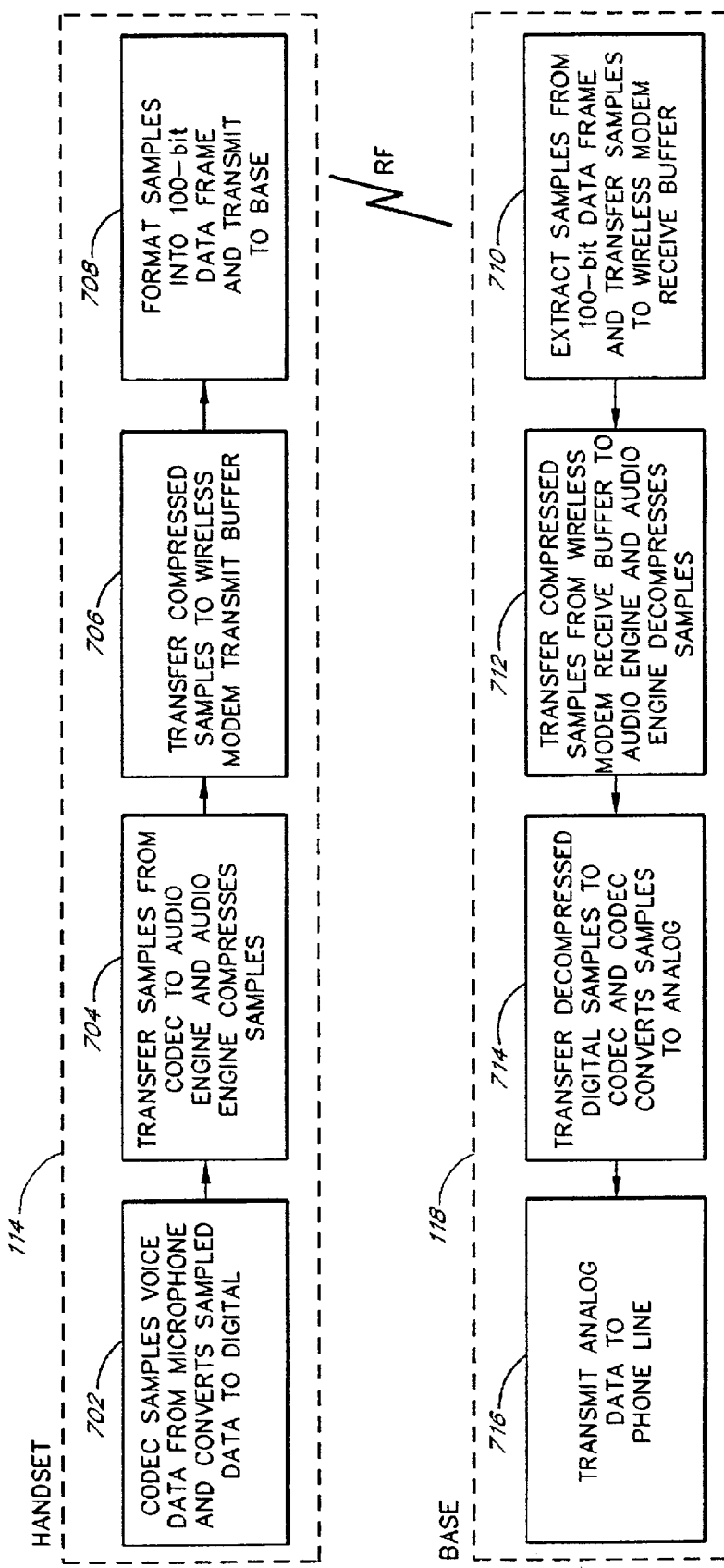
FIG. 7 illustrates steps performed in one embodiment of the present invention to receive analog audio signals with a wireless handset and to transmit representations of the audio signals to the telephone system.

FIG. 7 illustrates a sequence of steps performed in one embodiment of the present invention to receive voice input at the handset microphone 346, convert that voice input into radio frequency (RF) data, transmit the RF data from the handset 114 to the base 118, and to reproduce the voice data as analog data transmitted to the phone system. In a first step 702, a user speaks to generate voice data received by the microphone 346, and the codec 338 samples and converts the voice data from analog to digital. In a preferred embodiment, the codec 338 samples the voice data at 8 KHz.

In a next step 704, a CODEC interrupt (timed at 8 KHz in a preferred embodiment) generated by the timer/interrupt module 326 causes a CODEC_AE_TRANSFER task to be queued on the handset 114 and executed. The CODEC_AE_TRANSFER task shifts data values between components of the handset 114, shifting multiple values between multiple components upon a single interrupt.

In the step 704, the CODEC_AE_TRANSFER task instructs the microcontroller 314 to transfer a data sample that has been converted from analog to digital by the codec 338 to the audio engine 330 which converts the codec sample into a compressed digital representation such as, for example, adaptive delta pulse code modulation or ADPCM, one class of compression encoding and decoding algorithms used in audio compression. Those of ordinary skill will appreciate that other encoding and decoding algorithms could be used, and the present invention is not limited by an encoding and decoding technique. In a preferred embodiment, the audio engine 330 generates and outputs a 5-bit value to represent each compressed digital sample. In a further step 706, upon a next CODEC interrupt, the CODEC_AE_TRANSFER task instructs the microcontroller 314 to transfer the 5-bit compressed digital audio sample generated by the audio engine 330 into the modem transmit buffer 358.

It will thus be understood that, in a single 8 KHz cycle, data samples adjacent in time are shifted from the audio engine 330 to the modem transmit buffer 358, from the codec 338 to the audio engine 330, and from the microphone 346 to the codec 338. Moreover, during the same 8 KHz cycle, data traveling in the opposite direction (i.e., from the base 118 to the handset 114) are also shifted: from the codec 338 to the speaker 342, from the audio engine 330 to the codec 338, and from the modem receive buffer 360 to the audio engine 330. Thus, upon the occurrence of a CODEC interrupt and before the next CODEC interrupt, the CODEC_AE_TRANSFER task shifts data samples (travelling in both directions) between components.

In a step 708, the END_OF_FRAME_TX interrupt causes a TRANSMIT_DATA_FRAME task to be queued and executed. In accordance with the active frame format protocol, the TRANSMIT_DATA_FRAME task causes the microcontroller to set the frame format bits to indicate a data frame and also to send a transmit/receive signal to set tx enable (thus, the handset 114 will transmit a data frame in the frame period after the next frame). During an active frame period, the time-division duplex controller in the wireless modem 362 handles formatting the 5-bit samples taken from the modem transmit buffer 358 and, as described in relation to FIG. 2, guard bits, settling pattern bits, start bit, and supervisory channel data bits. The wireless modem 362 transmits the data to the radio 380, and the radio 380 transmits RF signals representing the data to the base 118.

The radio 480 receives the RF signals which are demodulated in the wireless modem 462. In a step 710, an END_OF_FRAME_RX interrupt generated on the base 118 signifies that a frame has been received. During an active receive frame period, the TDD controller in the wireless modem 462 formats the 5-bit samples into the modem receive buffer and also, formats the guard bits, settling pattern bits, start bit, and supervisory channel data bits. In a step 712, a CODEC interrupt on the base 118 causes a CODEC_AE_TRANSFER task to execute on the base 118. As on the handset 114, the CODEC_AE_TRANSFER task instructs the microcontroller 414 to transfer a 5-bit sample from the modem receive buffer 460 to the audio engine 430 for decompression. In a next step 714, upon the next CODEC interrupt, the CODEC_AE_TRANSFER task instructs the microcontroller 414 to transfer the decompressed sample from the audio engine 430 to the codec 438 for conversion to analog. In a further step 716, the codec 438 converts the digital audio data to analog data and transmits the analog data into the analog switch 491, which propagates the analog data over a line 495 into the telephone interface 494 and finally onto the telephone line 110.

Figure 8:
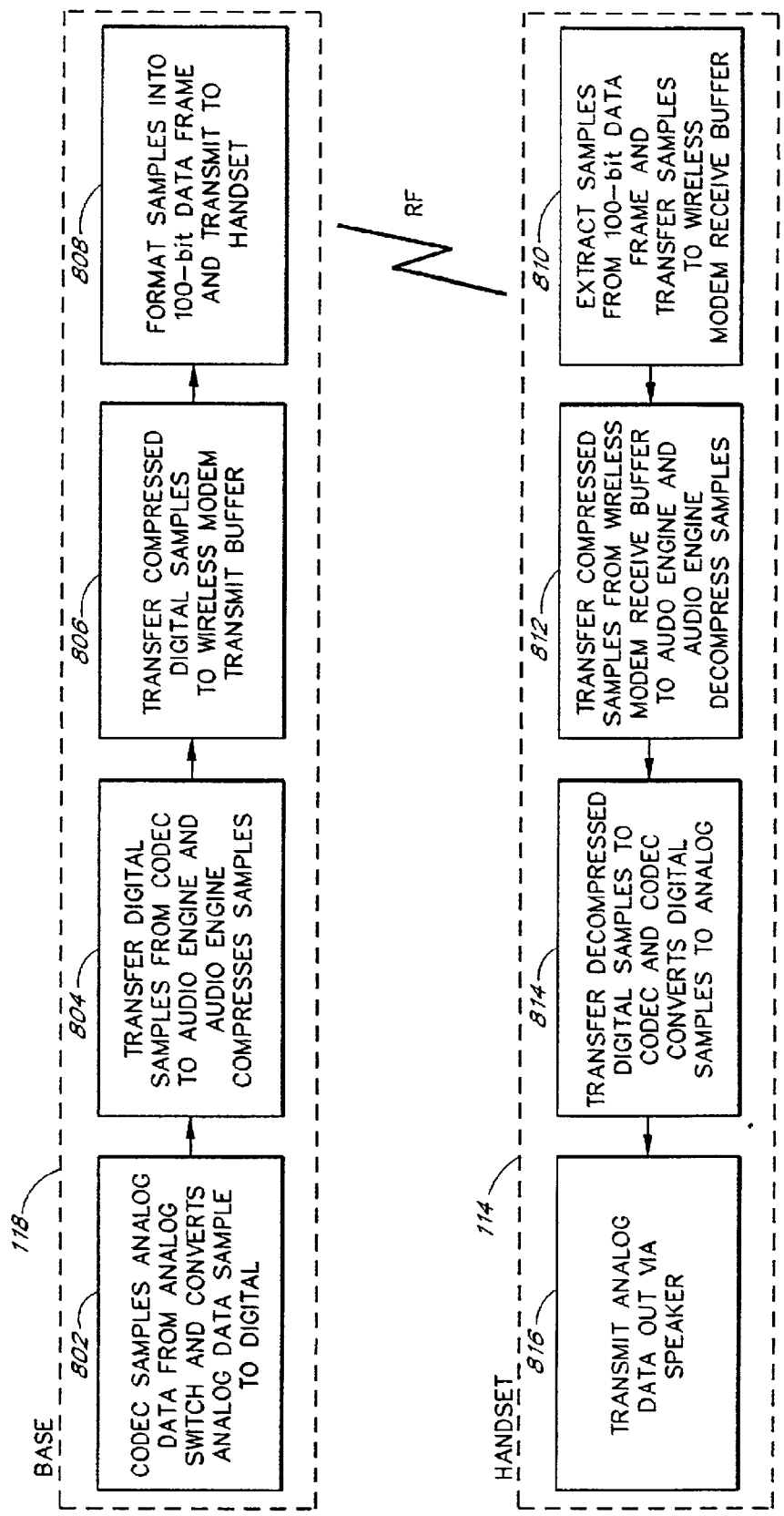
FIG. 8 illustrates steps performed in one embodiment of the present invention to receive analog audio signals from the telephone system and to reproduce the audio signals with a wireless handset.

FIG. 8 illustrates steps performed in one embodiment of the present invention wherein the base 118 receives analog data from a telephone line, samples the data, converts the analog data to digital, compresses the data, and transmits the data to the handset 114 which decodes the data to reproduce voice signals at the handset speaker 342. In a first step 802, the base 118 receives analog signals over the telephone line 110 (see FIG. 4). In the step 802, the codec 438 samples and converts the voice data from analog to digital. In a next step 804, a CODEC interrupt generated by the timer/interrupt module 426 causes a CODEC_AE_TRANSFER task to be queued on the base 118 and executed. The CODEC_AE_TRANSFER task instructs the microcontroller 414 to transfer the converted sample from the codec 438 to the audio engine 430 which converts the codec sample into a compressed digital representation (e.g., ADPCM) wherein a 5-bit value represents each compressed digital sample. It should be borne in mind that, upon the same CODEC interrupt, the CODEC_AE_TRANSFER task also shifts (or transfers) other data samples between other components as described in connection with FIG. 7.

In a further step 806, upon the next CODEC interrupt, the CODEC_AE_TRANSFER task causes the now-compressed 5-bit digital audio sample to be transferred from the audio engine 430 to the modem transmit buffer (TX FIFO) 458. In a step 808, an END_OF_FRAME_TX interrupt causes a TRANSMIT_DATA_FRAME task to be queued and executed, that task instructing the microcontroller 414 to set the TX enable and frame format bits (to specify a data frame) for the frame period after the next frame. During an active frame period, the time-division duplex controller in the wireless modem 462 formats the 5-bit samples taken from the modem transmit buffer 458 and the additional bits described above to generate a 100-bit data frame 208. The wireless modem 462 transmits the data to the radio 480, and the radio 480 transmits the data as RF signals to the handset 114.

The radio 380 receives the RF signals which are demodulated in the wireless modem 362. In a step 810, an END_OF_FRAME_RX interrupt generated on the handset 114 signifies that a frame has been received. During an active receive frame period, the TDD controller in the wireless modem 362 formats the 5-bit samples into the modem receive buffer along with, guard bits, settling pattern bits, start bit, and supervisory channel data bits.

In a next step 812, a CODEC interrupt on the handset 114 causes the CODEC_AE_TRANSFER task to execute. As explained in more detail above, the CODEC_AE_TRANSFER task shifts values corresponding to audio samples from component to component in the handset 114. The $CODEC_{13}$ AE_TRANSFER task instructs the microcontroller 314 to transfer a 5-bit compressed digital audio sample from the modem receive buffer 360 to the audio engine 330 which decompresses the 5-bit compressed digital sample. In a further step 814, upon the next CODEC interrupt, the CODEC_AE_TRANSFER task transfers the now-decompressed 5-bit digital sample to the codec 338 which converts the 5-bit sample to analog. In a still further step 816, the codec 338 transmits the analog data to the handset speaker 342 which reproduces the voice signals into audible sounds.

The CODEC interrupt and both the END_OF_FRAME_RX and END_OF_FRAME_TX interrupt are synchronized to prevent overflow or underflow of the modem transmit buffers 358, 458 or the modem receive buffers 360, 460.

Terminating Voice Communication

The KEYPAD_INTERPRETER detects user activation (pressing) of certain keypad keys having labels such as END or POWER that terminate voice telephone calls. When a terminating keypress is detected, the KEYPAD_INTERPRETER configures an END_CALL command for the supervisory channel.

In one embodiment, the 3-bit data type value is set to a value indicating that a command is represented in the 5-bit value field, and the 5-bit value field is configured to represent an END_CALL command. The handset 114 transmits the END_CALL command to the base 118 using the supervisory channel.

A supervisory channel interpreter running on the base 118 detects the END_CALL command, and schedules an END_CALL task for execution on the base 118. The END_CALL task terminates telephone communications by causing the hook relay in the telephone interface 494 to go on hook. The END_CALL task further sets to 0 the value of the VOICECOM flag on the base 118 and uses the supervisory channel as described above to cause the VOICECOM flag on the handset 114 also to be set to 0. Following the termination of voice communications, the handset 114 and base 118 then enter an idle state and perform one-second monitoring as described above.

Establishing Data Communication Link

The present invention advantageously supports common data communication standards. Thus, in accordance with one embodiment of the present invention, application software 302 running on a computer 112 uses an industry standard (e.g., Hayes compatible) communication module 304 to establish and perform data communications with a remote computer, even though the computer 112 is not directly connected by a telephone line 116 to a telephone jack 108. Also advantageously, the present invention uses a standard, RS232 communication interface to transfer data between the computer 112 and the handset 114. The RS232 standard is well known in the art and, hence, will not be explained in detail herein. One of ordinary skill will appreciate, however, that the present invention is not limited by a data communication interface.

When a user of the computer 112 desires to establish a link between the computer 112 and a remote computer, the user generally invokes an application program 302 that provides a user interface to control high-level communication between the computer 112 and the remote computer. The application program 302 typically relies on a communications module 304 to facilitate lower-level aspects of data communication such as, for example, interfacing with a physical serial port on the computer 112. One example of such an application program 302 is a web browser (e.g., Microsoft Internet Explorer version 3.03 produced and distributed by Microsoft Corporation of Redmond, Wash., which runs under the Microsoft Windows 3.1 operating system), and one example of a communications module 304 is a protocol stack and dialer module (e.g., Winsock.dll, a TCP/IP stack and dialer module provided by Microsoft Corporation).

A typical communications module 304 provides the computer 112 with the ability to interface with a modem connected to the computer 112. Thus, the application program 302 uses the communication module 304 to set communication parameters such as data transmission speed, to dial a telephone number associated with a remote computer, and to send data to and receive data from the remote computer. To interface with a modem, the communication module 304 sends commands to a lower-level device driver which responsively generates signals at various pin locations on the serial port and detects signals generated by the modem at certain pin locations on the serial port. The present invention is not limited by a particular port-serial, parallel or otherwise. However, one embodiment of the present invention described herein operates in accordance with a 25-pin serial port. In addition to generating and detecting signals on the serial port, the communication module 304 sends commands to the modem via the serial port to cause the modem to perform certain functions.

Nearly every modem is configured to perform functions in response to predetermined commands. There are dozens if not hundreds of different modem command sets, usually comprising sequences of byte values. One of the most widely used modem command sets is known as the Hayes command set (developed by Hayes Communications—a modem manufacturer). Many communication modules 304 are preprogrammed to issue modem commands according to the Hayes command set and, in this way, may support modems from many different manufacturers who produce modems compatible with the Hayes command set. While the present invention is not limited by the Hayes command set and can operate in accordance with other modem command sets, one embodiment of the present invention described herein operates using the Hayes command set. An alternative embodiment uses a Hayes command set extended to support functions related to wireless links.

In accordance with the present invention, the communication module 304 transmits a modem command to the handset 114, and the handset 114 transmits the modem command to the base 118 wherein the modem command is propagated to the modem 487. The modem 487 may respond by generating a result code (e.g., "OK" or "ERROR") and/or by echoing the received command. The base 118 transmits the result code or echoed command to the handset 114, and the handset 114 then transmits the code or command to the communication module 304. The communication module 304 scans the code or command to ensure that the modem 487 received the command properly. If not, the communication module 304 retransmits the modem command. This process of verifying the transmission and receipt of the modem command advantageously avoids buffering each modem command in the handset 114 upon transmitting the modem command to the base 118, waiting for confirmation from the base 118 and possibly retransmitting the modem command from the handset 114 before resuming communication between the handset 114 and the computer 112.

Figure 9:
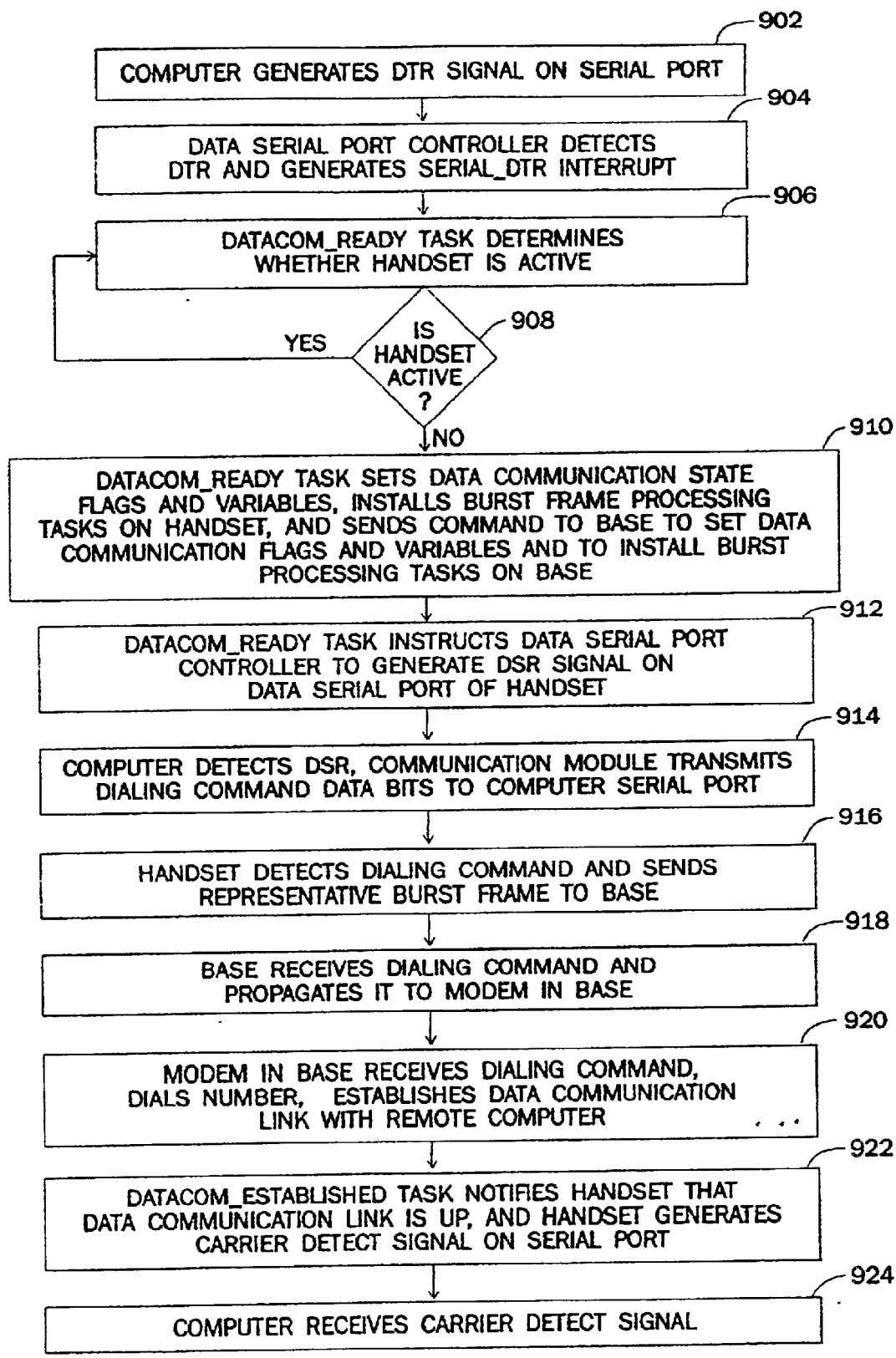
FIG. 9 illustrates steps performed in one embodiment of the present invention to establish a data communication link.

FIG. 9 illustrates steps performed by one embodiment of the present invention to initiate and establish a data communication link between computers remote to each other.

In a first step 902, the computer 112 generates a DTR (Data Terminal Ready) signal on pin 20 of the serial port, which propagates to the data serial port 310 of the handset 114. A communication component (e.g., a serial port device driver) of the operating system of the computer 112 typically causes the computer 112 to generate this signal. The DTR signal, well known in the field of serial communications, generally indicates to a communication device (e.g., a modem or the handset 114 of the present invention) that the computer is powered up and ready to transmit data. See, e.g., Ron White, *How Computers Work* 160 (1997). In a next step 904, the data serial port controller 312 detects a DTR signal on pin 20 of the data serial port 310 and, in response to the change of the signal on pin 20, generates a SERIAL_DTR interrupt. In response to the SERIAL_DTR interrupt, a DATACOM_READY task is scheduled and executes on the handset 114.

In a further step 906, the DATACOM_READY task checks the value of a VOICECOM flag (i.e., a location in RAM 352 that is set to 1 when the handset is supporting voice communications, and set to 0 when the handset 114 is not supporting voice communications) to determine whether the handset 114 is active. If the VOICECOM flag is set to 1, then the DATACOM_READY task determines that the handset 114 is already active. If, in a next step 908, the DATACOM_READY task determines that the handset 114 is already active, then the DATACOM_READY task uses the Q_TASK routine to queue itself (the DATACOM_READY task) in the SLOW_QUEUE 512, whereupon the DATACOM_READY task will be executed later (at a time when no higher priority task is scheduled) to again check the status of the handset 114.

If, however, in the step 908, the DATACOM_READY task determines that the handset 114 is not already active, then, in a step 910, the DATACOM_READY task accesses the DATACOM flag and, if it is zero (0), sets it to 1 and performs the following steps:

(1) sets to zero an 8-bit OB_FRAMES variable which counts the number of frames of an outgoing burst that have been formatted and transmitted to the receiving component, (2) sets to zero a BEGIN_BURST variable which, if not 0, indicates that the byte count of a current burst has been read, (3) sets to 0 two 8-bit variables called OUTGOING_BURST_BYTES and INCOMING_BURST_BYTES which respectively keep track of the number of bytes to be transferred to the base 118 and to be received from the base 118, (4) sets to two a MAX_OB_FRAMES variable that limits the number of frames transmitted in a burst, (5) sets to 256 a MAX_SERIAL_BUFFER variable used to limit the number of data bytes the handset 114 buffers upon receipt from the computer 112, or upon receipt from the base 118, and (6) establishes an active frame format protocol (represented by a pattern of bits) indicating a repeating sequence of frame transmit and receive events. In the preferred embodiment, the active frame format protocol selected by the DATACOM_READY task specifies the following four events: handset transmits a data frame, handset transmits a raw frame, handset receives a data frame, handset receives a raw frame. In conducting future communication with the base 118, the handset will repeat that four event sequence. Thus, when preparing to support data communications, the present invention initially configures the frame time divisions such that the handset 114 and the base 118 alternate in transmitting and receiving two-frame bursts.

In the step 910, the DATACOM_READY task also installs burst processing tasks on the handset 114 and the base 118 to prepare for generating and processing multi-frame bursts in support of data communications. By installing burst processing tasks on the handset 114 and the base 118, the DATACOM_READY task advantageously prepares the handset 114 and base 118 to generate and receive bursts.

In a single burst, raw frames are generally transmitted in groups preceded by an initial data frame. Thus, to transmit a burst, the handset 114 transmits groups of raw frames, one after the other, in a single direction (e.g., from handset 114 to base 118) preceded by a single data frame. In a preferred embodiment, the handset 114 transmits a burst of 2 frames (one data frame and one raw frame) with no intervening transmission from the base 118 to the handset 114. Likewise, when the base 118 transmits data to the handset 114, the base 118 transmits two frames (one data frame and one raw frame) with no intervening transmission by the handset 114. It will be understood that the present invention may allocate other time divisions, and, in particular, may do so at the direction of the application software 302 which may cause the communication module 304 to transmit a special modem command to the handset 114, the special modem command designed to change the allocation of frames to the handset 114 and base 118 for subsequent bursts.

Figure 10:
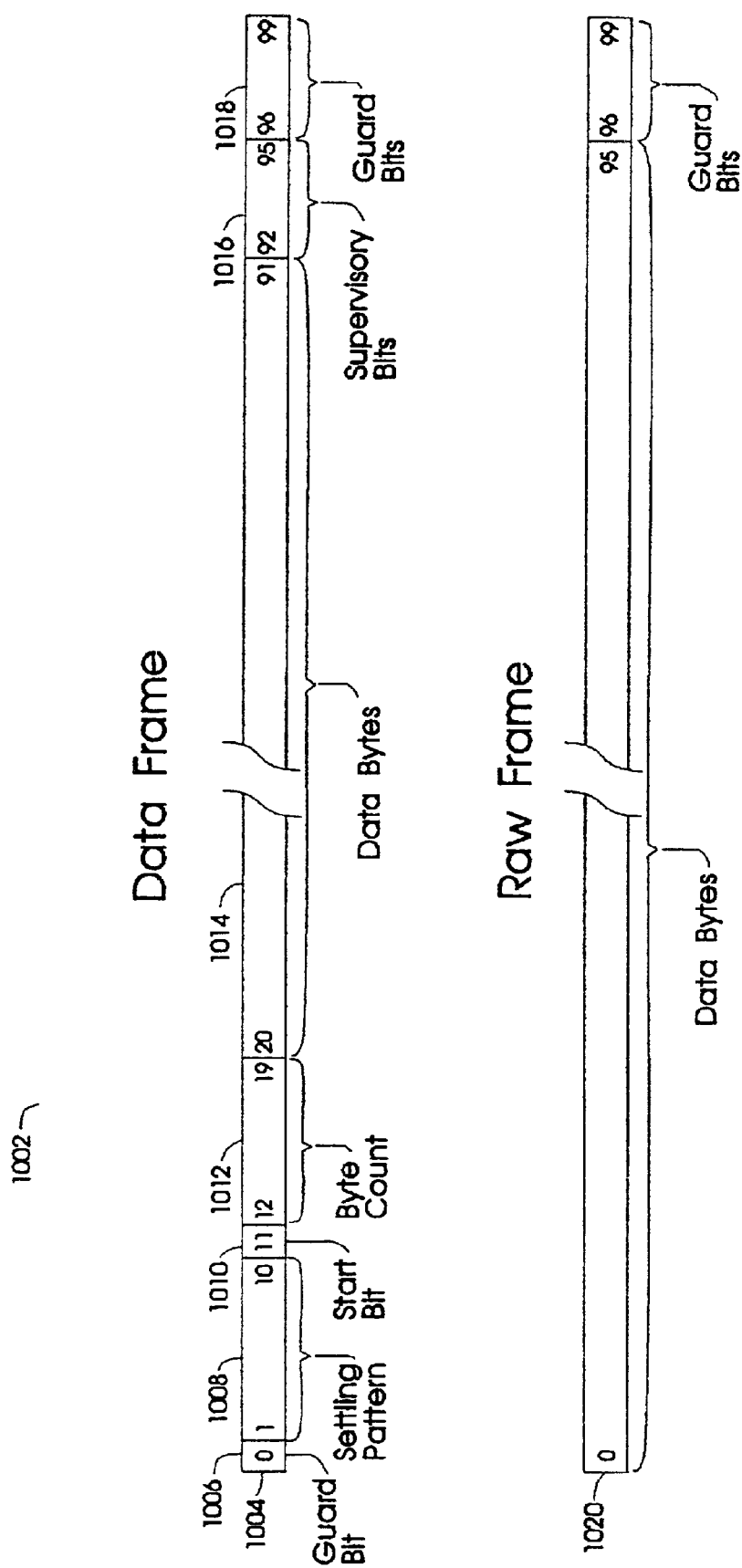
FIG. 10 illustrates a format of a burst in accordance with an embodiment of the present invention.

FIG. 10 illustrates a burst according to the present invention. A burst 1002 includes an initial 100-bit data frame 1004, and a 100-bit raw frame 1020. The 100 bits of the initial data frame 1004 are allocated to include: a 1-bit guard bit 1006, an 10-bit settling pattern field 1008 (providing a time for a receiving radio to switch from transmit mode to receive mode), a 1-bit start bit 1010, an 8-bit byte count field 1012, a 72-bit data byte field 1014 that may be allocated to include up to nine 8-bit bytes, a 4-bit supervisory channel field 1016, and a 4-bit guard bit field 1018. The 100 bits of the raw frame 1020 are allocated to include a 96-bit data field 204 (generally comprising up to 12 8-bit bytes), and either a 4-bit supervisory channel field 206 or, if the last frame of a burst, a 4-bit guard bit field. It will be appreciated by those of ordinary skill in the art that the 4-bit guard bit field may be excluded in any raw frame that does not terminate a burst, for example, in the second and third raw frames of a four-frame burst comprising an initial data frame, a second raw frame, a third raw frame, and a fourth raw frame.

The 8-bit byte count field 1012 of the initial data frame 1004 holds a value representing the number of 8-bit bytes represented in the two frames 1004, 1020 of the burst 1002. Thus, for example, if a burst includes a data frame 1004 having nine 8-bit bytes in the data byte field 1014 and a raw frame 1020 having seven 8-bit bytes in its data byte field 204, then the data byte field 1014 of the data frame would be set to 16 (9+7) to indicate the total number of data bytes included in the burst 1002. It will be readily understood that, in this embodiment, a burst may transmit up to twenty-one bytes.

Turning once again to FIG. 9, the DATACOM_READY task, in the step 910, installs burst processing tasks on the handset 114, enabling the handset 114 to handle multi-frame bursts. The DATACOM_READY task does this by replacing addresses in the jump table 528 of the handset 114. In particular, at the offset location in the jump table 528 indicated by using the END_OF_FRAME_TX interrupt value as an index, the DATACOM_READY task replaces the address of the TRANSMIT_DATA_FRAME task with the address of a TRANSMIT_BURST task. Following that replacement, each occurrence of the END_OF_FRAME_TX interrupt on the handset 114 causes the TRANSMIT_BURST task to be scheduled and executed. Also, the DATACOM_READY task installs the address of a RECEIVE_BURST task in the jump table 528 at the offset location indicated by using the END_OF_FRAME_RX interrupt value as an index. Following installation of that address, each occurrence of the END_OF_FRAME_RX interrupt on the handset 114 causes the RECEIVE_BURST task to be scheduled and executed.

The DATACOM_READY task, in the step 910, installs another burst processing task in the jump table 528 of the handset 114. At the offset location indicated by using the CODEC interrupt value as an index, the DATACOM_READY task replaces the address of the CODEC_AE_TRANSFER task with the address of a BUFFER_TRANSFER task. After that replacement, each occurrence of the CODEC interrupt (timed at 8 KHz in a preferred embodiment) causes the BUFFER_TRANSFER task to be queued and executed.

To prepare the base 118 for data communications, the DATACOM_READY task, in the step 910, uses the supervisory channel of subsequent frames to send state change information to the base 118 enabling it to receive and process frames transmitted in the burst format. In one embodiment, the DATACOM_READY task sets the supervisory channel's 3-bit data type field to indicate that a command is included in the 5-bit data field, and sets the 5-bit data field to a value corresponding to a command to change frame format to burst format (e.g., the default burst format comprising one data frame and one raw frame).

A supervisory channel interpreter on the base 118 (executed upon receipt of each RF packet) receives that information as represented in the supervisory channel bits and establishes an active frame format protocol (represented, as on the handset 114, by a pattern of bits) indicating a repeating sequence of frame transmit and receive events. In the preferred embodiment, the active frame format protocol operates in synchronism with that of the handset, and in particular specifies the following four events: base receives a data frame, base receives a raw frame, base transmits a data frame, base transmits a raw frame. In conducting future communication with the handset 114, the base 118 will repeat these four events in sequence. Thus, in accordance with the present invention, an active frame format protocol supports data communications by configuring the frame time divisions such that the handset 114 and the base 118 alternate in transmitting and receiving two-frame bursts.

The supervisory channel interpreter also updates the jump table 528 of the base 118 by placing in the jump table 528, at offsets calculated using the respective values of the END_OF_FRAME_TX and END_OF_FRAME_RX interrupts, the addresses of TRANSMIT_BURST and RECEIVE_BURST tasks, which operate similarly to the same-named tasks described above in relation to the handset 114. Also, the supervisory channel interpreter replaces the address of the CODEC_AE_TRANSFER task in the jump table 528 of the base 118 with the address of a BUFFER_TRANSFER task at the offset location identified using the value of the CODEC interrupt.

Once the installation of the TRANSMIT_BURST, RECEIVE_BURST, and BUFFER_TRANSFER tasks on the base 118 is completed, each occurrence of the END_OF_FRAME_TX interrupt on the base 118 causes the TRANSMIT_BURST task to be executed, each occurrence of the END_OF_FRAME_RX interrupt causes the RECEIVE_BURST task to be executed, and each occurrence of the CODEC interrupt causes the BUFFER_TRANSFER task to be executed.

Also, in the step 910 the supervisory channel interpreter executing on the base 118 sets the base DATACOM flag to 1 and performs the following steps:

(1) sets to zero an 8-bit OB_FRAMES variable which counts the number of frames of an outgoing burst that have been formatted and transmitted to the handset 114, (2) sets to zero a BEGIN_BURST variable which, if not 0, indicates that the byte count of a current burst has been read, (3) sets to zero the value of two 8-bit variables called OUTGOING_BURST_BYTES and INCOMING_BURST_BYTES which keep track of the number of bytes to transfer to the handset 114 and to receive from the handset 114, (4) sets to two a MAX_OB_FRAMES variable that limits the number of frames transmitted in a burst, and (5) sets to 256 the value of a MAX_SERIAL_BUFFER variable that limits the number of data bytes the base 118 buffers in its outgoing data buffer 453 or its incoming data buffer 455.

The TRANSMIT_BURST, RECEIVE_BURST, and BUFFER_TRANSFER tasks, installed on the handset 114 and the base 118, facilitate the transmission of data received at the serial port 310 of the handset 114 to the modem 487 of the base 118, and, in the reverse direction, from the modem 487 to the serial port 310. The processes that transfer the data are timed by various interrupts, the SERIAL_DATA_IN and SERIAL_DATA_OUT interrupts, the CODEC interrupt, and the END_OF_FRAME_TX and END_OF_FRAME_RX interrupts.

Figure 11:
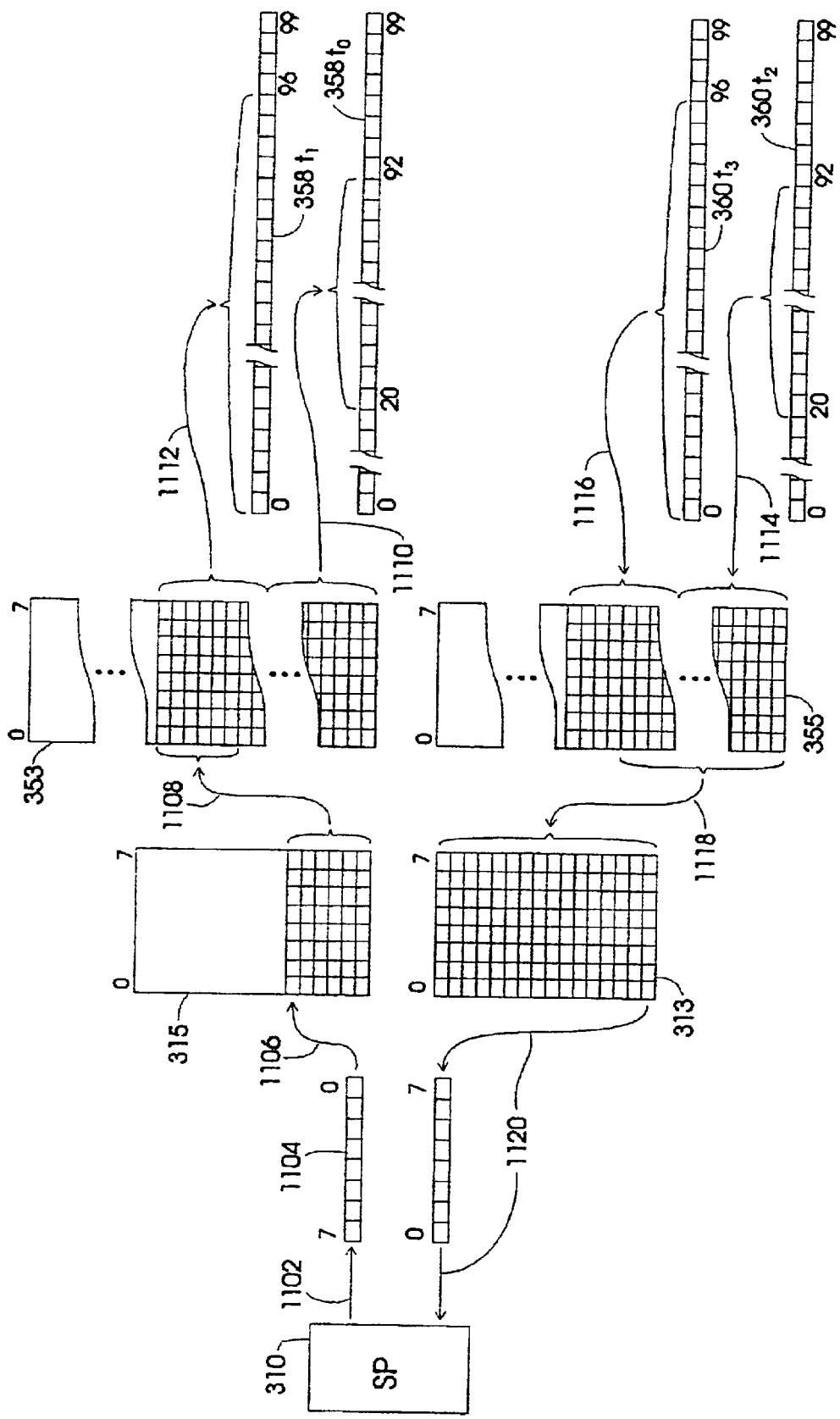
FIG. 11 illustrates steps in accordance with an embodiment of the present invention to buffer data received at a communication port of a wireless handset and to transfer the data to a wireless modem transmit buffer, and also illustrates steps in accordance with an embodiment of the present invention to buffer data received in a wireless modem receive buffer and to transfer the data to a communication port of a wireless handset.

FIG. 11 represents an illustration of steps performed in an embodiment of the present invention to move data in two directions between the serial port 310 of the handset 114 and the modem transmit and receive buffers 358, 360. When a stream of data bits is generated by the computer 112 and propagated to the serial port 310 (typically on pin 2 of the RS232 interface), the data serial port controller 312, in a step 1102, detects the bits, and converts each sequence of eight bits into an 8-bit byte 1104. In a next step 1106, the data serial port controller 312 stores the 8-bit byte in the serial port receive buffer 315 (a 16-byte buffer in a preferred embodiment) at a location identified by a pointer to the next free location. The data serial port controller 312 maintains the serial port receive buffer 315 in a circular manner, repositioning the pointer to point to the first byte location of the serial port receive buffer 315 after causing a byte to be stored in the last byte position.

Scheduled at a relatively low priority, a SERIAL_DATA_IN interrupt is generated by the timer/interrupt module 326 whenever the serial port receive buffer 315 is not empty. A SERIAL_DATA_INPUT task executes upon the occurrence of the SERIAL_DATA_IN interrupt and, in a step 1108, transfers data from the serial port receive buffer 315 (SPRB) to the outgoing data buffer 353 (ODB). The SERIAL_DATA_IN interrupt occurs with sufficient frequency that the serial port receive buffer 315 does not become full even when the computer 112 transmits data to the serial port 310 at high data rates. In one embodiment of the present invention, the SERIAL_DATA_IN interrupt is generated with sufficient frequency to avoid a buffer overflow condition even when the computer 112 transmits data to the serial port 310 at 128 kilobits per second.

The SERIAL_DATA_INPUT task uses start and end pointers to byte locations in the SPRB 315 to determine which bytes to transfer. The SPRB start pointer points to a byte location storing the first byte received which has not been transferred to the outgoing data buffer 353, and the SPRB end pointer points to the last byte stored in the serial port receive buffer 315 at the time the SERIAL_DATA_IN interrupt occurred. The SERIAL_DATA_INPUT task determines a target byte location in the outgoing data buffer 353 by accessing a next location pointer. The next location pointer points to the next available byte location in the outgoing data buffer 353. In the step 1108, the SERIAL_DATA_INPUT task instructs the microcontroller 314 to transfer the identified bytes from the SPRB 315 to the ODB 353, incrementing the SPRB start pointer and the next location pointer to effect each byte transfer. The SERIAL_DATA_INPUT task increments the SPRB start pointer and next location pointer again, following the transfer of all bytes, to properly set the pointers for the next transfer upon the occurrence of the next SERIAL_DATA_IN interrupt. Because the SPRB 315 and the ODB 353 function as circular buffers, the SPRB start pointer and the ODB next location pointer are set to the beginning of the respective buffer whenever an increment causes them to point beyond the last byte location.

In response to certain END_OF_FRAME_TX interrupts, the TRANSMIT_BURST task determines how many bytes will be transmitted in the next two-frame burst. The END_OF_FRAME_TX interrupt occurs every frame period, but does not correspond to the transmission of a frame when the handset is receiving frames, and, in those cases, no transmit action takes place. In particular, when the handset 114 receives a data frame (the first frame in a burst) corresponding to an END_OF_FRAME_RX, the TRANSMIT_BURST task can then, upon a near concurrent END_OF_FRAME_TX interrupt, determine how many bytes will be transferred in the next burst that the handset will transmit. Also, at that time the TRANSMIT_BURST task sets the tx enable and frame format bits to permit the handset 114 to transmit a data frame during the frame period after the next frame period.

Thus, in response to a particular END_OF_FRAME_TX interrupt, the TRANSMIT_BURST task determines the number of bytes to transmit in the next burst. To do that, the TRANSMIT_BURST task examines pointers to byte locations in the outgoing data buffer 353. In particular, the TRANSMIT_BURST task calculates the number of bytes in the ODB 353 that remain to be transferred into frames by identifying the bytes between and referenced by two pointers: an ODB start pointer (which points to the first byte in time that has not been transferred into the modem transmit buffer 358 for transmission to the base 118), and an ODB end pointer (which points to the last byte received but not yet transferred into the modem transmit buffer for transmission).

In one embodiment the ODB end pointer refers to the address pointed to by the next location pointer, maintained by the SERIAL_DATA_INPUT task.

The TRANSMIT_BURST task may adjust the number of bytes to be transferred. In the preferred embodiment of the present invention, a burst comprises two frames: a data frame holding up to 9 bytes, and a raw frame holding up to 12 bytes. Thus, the burst can represent no more than 21 bytes. If the number of bytes to be transferred from the outgoing data buffer 353 exceeds 21, then the TRANSMIT_BURST simply selects 21 as the number of bytes that will be transferred. The TRANSMIT_BURST task stores the number of bytes to be transferred, whether or not adjusted, in an OUTGOING_BURST_BYTES variable and instructs the microcontroller 314 to transfer the value of the OUTGOING_BURST_BYTES variable to the 8-bit byte count field 1012 of the initial data frame, and thus encodes the number of data bytes of the entire burst in the initial data frame of the next burst. The TRANSMIT_BURST task also sets a modem transmit buffer pointer to the beginning of the modem transmit buffer 358.

In response to an END_OF_FRAME_RX interrupt corresponding to the receipt of the first data frame of a burst, the RECEIVE_BURST task determines how many bytes the handset 114 will receive in a burst transmitted from the base 118. The RECEIVE_BURST task accesses the byte count field 1012 of the first frame (a data frame) of a burst transmitted from the base 118. The byte count represents the number of bytes that will transmitted in the entire two-frame burst. Alternative embodiments are contemplated wherein a burst may include more than two frames and the number of bits allocated for the byte count field may well exceed eight (8). The RECEIVE_BURST task sets the value of an INCOMING_BURST_BYTES variable to be the same as the value of the byte count field 1012. Thus, the RECEIVE_BURST task prepares the handset to receive the number of bytes that the base 118 will transmit in a burst.

To transfer bytes from the outgoing data buffer 353 into the modem transmit buffer 358, and to transfer bytes from the modem receive buffer 360 to the incoming data buffer 355, the BUFFER_TRANSFER task is executed upon each occurrence of the CODEC interrupt. The BUFFER_TRANSFER task determines which frame of the current burst is to be constructed next on the handset 114. It does this by accessing the OB_FRAMES variable. In a preferred embodiment, the OB_FRAMES variable is 0 when no frames of a burst have been transmitted, and thus, the first frame of the burst is to be constructed. When the OB_FRAMES variable is 1, the first frame of the burst has been constructed and transmitted to the base 118, and the second frame of the burst is to be constructed next. After determining which frame of the burst is to be constructed, the BUFFER_TRANSFER task determines the number of bytes to transfer into the modem transmit buffer 358 by accessing the OUTGOING_BURST_BYTES variable.

For example, if the OB_FRAMES variable is 0, the BUFFER_TRANSFER task determines that the first frame (a data frame) of a burst is to be constructed. Then the BUFFER_TRANSFER task accesses the OUTGOING_BURST_BYTES variable to determine the number of bytes to transfer into the modem transmit buffer 358. If the value of the OUTGOING_BURST_BYTES variable is nine (9) or greater, then the BUFFER_TRANSFER task, in a step 1110, transfers a maximum (9) number of bytes from the outgoing data buffer 353 into the modem transmit buffer 358 (as the data frame format permits up to 9 bytes) at a time to. If the value of the OUTGOING_BURST_BYTES is less than nine (9), then the BUFFER_TRANSFER task, in the step 1110, transfers a number of bytes equal to the OUTGOING_BURST_BYTES value from the outgoing data buffer 353 into the modem transmit buffer 358.

To determine whether the modem transmit buffer 358 is empty, the BUFFER_TRANSFER task accesses the modem transmit buffer pointer and checks whether it references an address corresponding to the beginning of the modem transmit buffer 358. If not, the BUFFER_TRANSFER task transfers no data into the modem transmit buffer 358. If the modem transmit buffer pointer does point to the beginning of the modem transmit buffer 358, then BUFFER_TRANSFER task uses the modem transmit buffer pointer as a target location at which to copy bytes. The BUFFER_TRANSFER task references the ODB start pointer to determine the address of each byte to copy from the outgoing data buffer 353, and advances the ODB start pointer and the modem transmit buffer pointer after each transfer.

After transferring the bytes to the modem transmit buffer 358, the BUFFER_TRANSFER task subtracts the number of transferred bytes from the OUTGOING_BURST_BYTES variable and increments the OB_FRAMES variable. If, after incrementing, the BUFFER_TRANSFER task detects that the OB_FRAMES variable equals the MAX_OB_FRAMES variable, then the BUFFER_TRANSFER task sets the OB_FRAMES variable to 0. That condition generally occurs only after the BUFFER_TRANSFER task has transferred bytes for the last frame in the burst.

Upon the occurrence of a later CODEC interrupt, the BUFFER_TRANSFER task executes again. If the OB_FRAMES variable is 1, then the BUFFER_TRANSFER task determines that a raw frame is to be constructed. The BUFFER_TRANSFER task accesses the OUTGOING_BURST_BYTES variable to determine the number of bytes to transfer from the ODB 353 to the modem transmit buffer 358. In a preferred embodiment, the value of the OUTGOING_BURST_BYTES variable will be 12 or less when the BUFFER_TRANSFER task transfers bytes into the modem transmit buffer 358 for the purpose of constructing a raw frame, and, in that case, the BUFFER_TRANSFER task, in a step 1112, transfers a number of bytes equal to the value of the OUTGOING_BURST_BYTES variable from the ODB 353 to the modem transmit buffer 358 at a time $t_1$.

However, in alternative embodiments, where the number of raw frames in a burst is larger than one, and where the OUTGOING_BURST_BYTES variable may be greater than 12, the BUFFER_TRANSFER task transfers 12 bytes (the maximum number that a raw frame can represent) from the outgoing data buffer 353 into the modem transmit buffer 358, unless the OUTGOING_BURST_BYTES variable is less than 12. When it is less than 12, the BUFFER_TRANSFER task transfers the number of bytes represented by the OUTGOING_BURST_BYTES variable.

After transferring bytes into the modem transmit buffer 353, the BUFFER_TRANSFER task subtracts the number of transferred bytes from the OUTGOING_BURST_BYTES variable. The BUFFER_TRANSFER task also increments the OB_FRAMES variable. If, after incrementing, the BUFFER_TRANSFER task detects that the OB_FRAMES variable equals the MAX_OB_FRAMES variable, then the BUFFER_TRANSFER task sets the OB_FRAMES variable to 0.

The BUFFER_TRANSFER task also monitors the ODB 353 for possible overflow conditions. Thus, the BUFFER_TRANSFER task compares the number of bytes currently in the ODB 353 that have not been transferred out with the MAX_SERIAL_BUFFER threshold (256 in a preferred embodiment). In one embodiment, the BUFFER_TRANSFER task determines the number of bytes in the ODB 353 by comparing the addresses referenced by the ODB start and end pointers. If the number of bytes in the ODB 353 differs from the value of MAX_SERIAL_BUFFER by 16 or less, then the BUFFER_TRANSFER task instructs the data serial port controller 312 to drop (turn off) the CTS (clear to send) signal. Dropping the CTS signal indicates to the computer 112 that the handset (which may appear to the computer 112 no different than a modem) is not available to receive data. Upon a subsequent CODEC interrupt, the BUFFER_TRANSFER task instructs the data serial port controller 312 to raise the CTS signal on the serial port 310 if the BUFFER_TRANSFER task determines that the number of bytes in the ODB 353 differs from MAX_SERIAL_BUFFER by more than 16.

The BUFFER_TRANSFER task also transfers bytes from the modem receive buffer 360 to the incoming data buffer 355. If the BEGIN_BURST variable is 0, then the BUFFER_TRANSFER task reads the byte count field included in the initial data frame of each burst. The BUFFER_TRANSFER task uses that value to set the INCOMING_BURST_BYTES variable and also to determine how many bytes to transfer from the modem receive buffer 355 to input the entire current burst. After reading the byte count from the modem receive buffer, the BUFFER_TRANSFER task sets to one the BEGIN_BURST variable. Thus, on a subsequent codec interrupt, the BUFFER_TRANSFER task will not read a byte count.

The BUFFER_TRANSFER task maintains its own pointer into the modem receive buffer, initialized to point to the beginning of the modem receive buffer 360. The BUFFER_TRANSFER task determines whether to transfer bytes from the modem receive buffer 360 by checking whether a modem receive buffer pointer maintained by the wireless modem 362 points to a different location than its own pointer to the modem receive buffer 360. If not, the BUFFER_TRANSFER task transfers no bytes to the incoming data buffer 355. If so, the BUFFER_TRANSFER task uses the modem receive buffer pointer to determine how many bytes to transfer, and increments its own pointer as needed until completion of the transfer when its own pointer points to the same location as the modem receive buffer pointer.

The BUFFER_TRANSFER task determines what location in the incoming data buffer (IDB) 355 to transfer the bytes by accessing a next location pointer to the IDB 355. The BUFFER_TRANSFER task maintains the next location pointer to the IDB 355 in a circular manner, setting the pointer to the beginning of the IDB 355 whenever incrementing the pointer causes it to point beyond the end of the IDB 355.

If the value of the INCOMING_BURST_BYTES variable is equal to or greater than the number of bytes that can be represented by the current frame type, then the BUFFER_TRANSFER task transfers a number of bytes from the modem receive buffer 360 into the IDB 355, the number of bytes equal to the maximum number of bytes that can be represented by the current frame. Otherwise, the number of bytes transferred is equal to the value of the INCOMING_BURST_BYTES variable.

After the transfer of bytes into the IDB 355, the BUFFER_TRANSFER task subtracts the number of bytes transferred from the value of the INCOMING_BURST_BYTES variable. The BUFFER_TRANSFER task sets to 0 the BEGIN_BURST variable when the INCOMING_

BURST_BYTES variable is zero. This permits the BUFFER_TRANSFER task to determine that the next frame will be the first frame of a new burst, and that, when new data arrives in the modem receive buffer 360, the BUFFER_TRANSFER task should read the byte count for the new burst.

As one example, the BUFFER_TRANSFER task determines that bytes from the first frame—a data frame—of a burst will be transferred into the IDB 355. In a step 1114, the BUFFER_TRANSFER task transfers bytes from the modem receive buffer 360 at a time $t_2$ into the IDB 355. The BUFFER_TRANSFER task subtracts the number of transferred bytes from the value of the INCOMING_BURST_BYTES variable. In a next step 1116, the BUFFER_TRANSFER task executes in response to a later CODEC interrupt, and transfers bytes from the modem receive buffer 360 at a time $t_3$ into the IDB 355, the number of bytes transferred specified by the value of the INCOMING_BURST_BYTES variable. It will be understood that, in an alternative embodiment wherein the number of raw frames in a burst is greater than one, possibly much greater, the INCOMING_BURST_BYTES variable would specify a larger number of bytes to be transferred, possibly in the hundreds or thousands or even higher. After subtracting the number of transferred bytes from the INCOMING_BURST_BYTES variable, and determining that that variable is 0, the BUFFER_TRANSFER task sets the BEGIN_BURST variable to 0.

The BUFFER_TRANSFER task also transfers bytes, as required, from the IDB 355 to the serial port transmit buffer 313. The BUFFER_TRANSFER task checks the contents of the serial port transmit buffer (SPTB) 313 and, if empty, transfers bytes from the IDB 355 into the SPTB 313. In particular, the BUFFER_TRANSFER task compares an SPTB start pointer with an SPTB end pointer. If the two reference identical addresses, then the BUFFER_TRANSFER task determines that the SPTB 313 is empty. If the SPTB 313 is not empty, the BUFFER_TRANSFER task terminates. If the SPTB 313 is empty, however, the BUFFER_TRANSFER task compares an IDB start pointer with an IDB end pointer (in one embodiment, the IDB end pointer references the same address as the IDB next location pointer) to determine whether bytes that have not been transferred to the SPTB 313 exist in the IDB 355. If not, then the BUFFER_TRANSFER task terminates. If bytes remain in the IDB 355, then the BUFFER_TRANSFER task, in the step 1118, transfers as many bytes as possible (up to 16) from the IDB 355 into the SPTB 313. To effect the transfer, the BUFFER_TRANSFER task uses the IDB start pointer to access successive bytes from the IDB 355 and transfers those bytes to locations in the SPTB 313 identified by successively incrementing the SPTB end pointer. At the termination of the transfer, the IDB start pointer points to the next untransferred byte in the IDB 355, and the SPTB end pointer points to the last byte transferred into the SPTB 313.

Byte data stored in the SPTB 313 are transferred to the serial port 310 by a SERIAL_DATA_OUTPUT task in response to a SERIAL_DATA_OUT interrupt. The SERIAL_DATA_OUT interrupt occurs at intervals predetermined to achieve a desired rate of output. In a preferred embodiment, the SERIAL_DATA_OUT interrupt is generated when the SPTB 313 is not empty. The SERIAL_DATA_OUTPUT task executes in response to each SERIAL_DATA_OUT interrupt. The SERIAL_DATA_OUTPUT task, in the step 1120, instructs the microcontroller 314 to transfer the bits of the byte referenced by the SPTB start pointer to the serial port 310 (pin 3 of the serial port 310 in a preferred embodiment). The SERIAL_DATA_OUTPUT task advances the SPTB start pointer following the transfer. It will be appreciated by those of ordinary skill that interrupts generated by the base 118 similar to those generated on the handset 114 cause tasks executed on the base 118 (also similar to those executed on the handset 114) to transfer data in both directions between the modem 487 and the modem transmit and receive buffers 458, 460.

Figure 12:
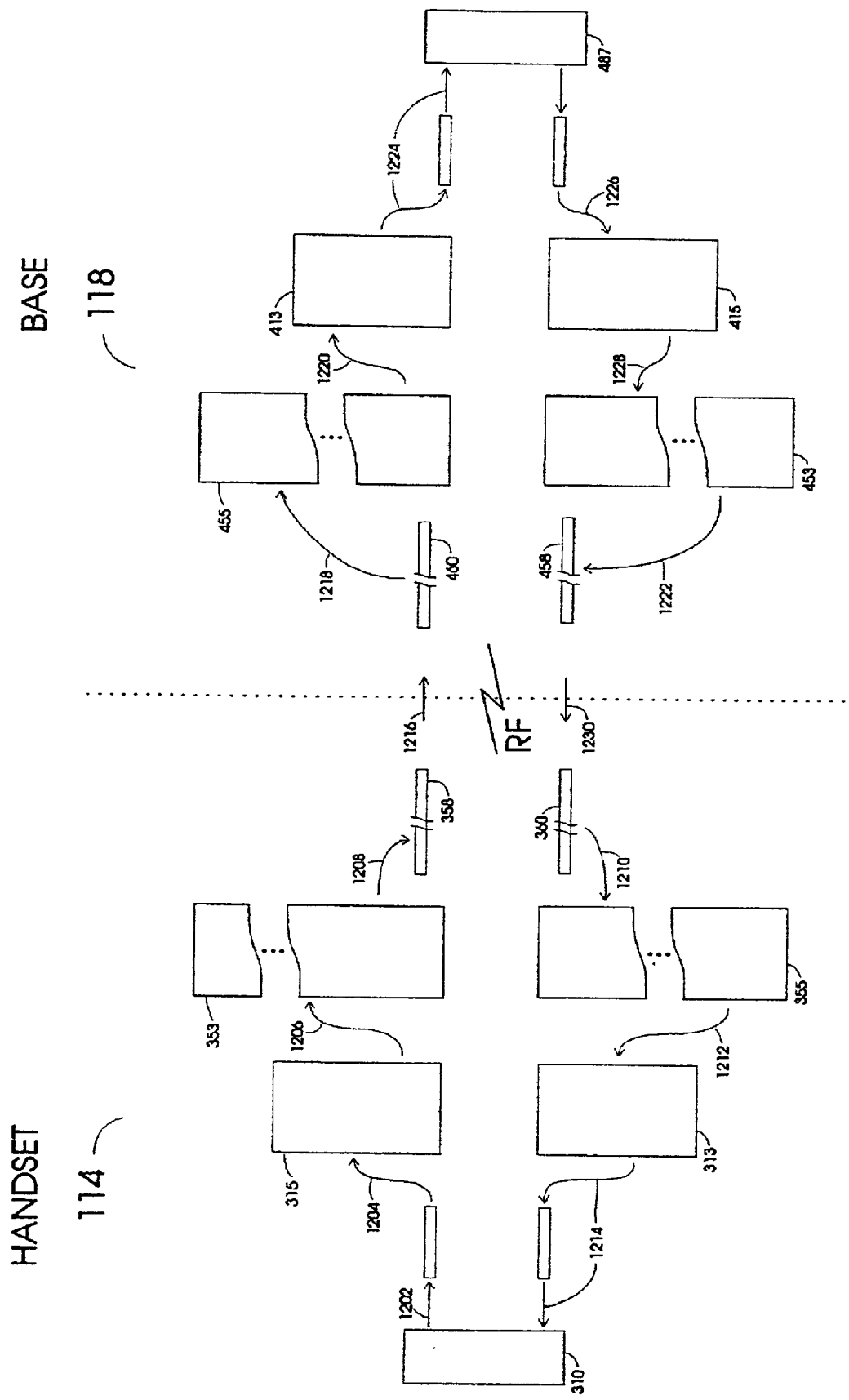
FIG. 12 illustrates steps performed by an embodiment of the present invention to receive data at a communication port of a handset and to transfer that data to a modem in a base, and also illustrates steps performed by an embodiment of the present invention to receive data at a modem of a base and to transfer the data to a communication port of a handset.

FIG. 12 illustrates steps in moving data from the serial port 310 of the handset 114 to the modem 487 and from the modem 487 to the serial port 310 of the handset 114. The steps described in connection with FIG. 12 do not necessarily occur in time in the order described. In a step 1202, the data serial port controller 312 detects the presence of bit data on the serial port 310. In a further step 1204, the data serial port controller 312 transfers a received byte into the SPRB 315. In a step 1206, the SERIAL_DATA_INPUT task, in response to a SERIAL_DATA_IN interrupt, transfers bytes from the SPRB 315 to the outgoing data buffer (ODB) 353.

In a step 1208, the BUFFER_TRANSFER task, in response to the CODEC interrupt, transfers bytes from the ODB 353 into the modem transmit buffer 358, and also, in another step 1210, transfers bytes from the modem receive buffer 360 into the incoming data buffer (IDB) 355. The BUFFER_TRANSFER task also, in a further step 1212, transfers bytes from the IDB 355 into the serial port transmit buffer (SPTB) 313. In another step 1214, the SERIAL_DATA_OUTPUT task, in response to the SERIAL_DATA_OUT interrupt, transfers a byte from the SPTB 313 to the serial port 310.

In a next step 1216, the handset 114 transmits an RF signal representing the bytes in the modem transmit buffer 358. The base 118 receives the RF signal and reproduces the represented bits in the modem receive buffer 460. In response to a CODEC interrupt, a BUFFER_TRANSFER task executing on the base 118, in a step 1218 transfers data from the modem receive buffer 460 to the incoming data buffer (IDB) 455. The BUFFER_TRANSFER task also, in a next step 1220, transfers bytes from the IDB 455 to the serial port transmit buffer 413. In another step, 1222, the BUFFER_TRANSFER task transfers bytes from the outgoing data buffer 453 to the modem transmit buffer 458.

In a step 1224, a SERIAL_DATA_OUTPUT task, executing on the base 118 in response to a SERIAL_DATA_OUT interrupt, transfers a byte (as a series of bits) from the SPTB 413 to the modem 487. Differing from the same-named task on the handset 114, the SERIAL_DATA_OUTPUT task transmits a bitstream to the modem 487 on a transmit line (TXD, which generally corresponds to pin 2 of a standard 25-pin RS232 interface), rather than using the receive line (pin 3 or RXD) used by the SERIAL_DATA_OUTPUT task on the handset 114 to transmit bits to the computer 112. The data serial port controller 412, in a step 1226, transfers a byte received from the modem 487, into the serial port receive buffer (SPRB) 453. In another step 1228, a SERIAL_DATA_INPUT task, in response to a SERIAL_DATA_IN interrupt generated on the base 118, transfers bytes from the SPRB 453 to the outgoing data buffer 453. In a step 1230, the radio 480 of the base 118 transfers an RF signal to the handset 114 representing the bits in the modem transmit buffer 458.

It will be appreciated that the present invention may operate without the outgoing data buffers 353, 453, or without the incoming data buffers 355, 455, or without both. In an embodiment without the outgoing data buffers 353, 453, the SERIAL_DATA_INPUT task, responsive to the CODEC interrupt, transfers bytes from a serial port receive buffers (SPRB) 315, 415 to the modem transmit buffers 358, 458. In that embodiment, the size of the SPRB 315 may be increased to 32 bytes or more. In an embodiment without the incoming data buffers 355, 455, the BUFFER_TRANSFER task, responsive to the CODEC interrupt, transfers bytes from the modem receive buffers 360, 460 to the serial port transmit buffers 313, 413.

Turning again to FIG. 9, in a next step 912, the DATACOM_READY task instructs the data serial port controller 312 to generate a DSR (Data Set Ready) signal on pin 6 of the data serial port 310, which signal propagates to the serial port 306 of the computer 112. The DSR signal, also well known in the field of serial communication, indicates to the computer 112 that the handset 114 is ready to receive data.

In an alternative embodiment of the present invention, the DATACOM_READY task, in the step 912, sends a supervisory channel command to the base 118, causing the supervisory channel interpreter executing on the base 118 to instruct the data serial port controller 412 to generate a DTR signal on the serial interface to the modem 487. The modem 487 responds to the change in the DTR signal by generating a DSR signal on the serial interface, to which the data serial port controller 412 responds by generating a SERIAL_DSR interrupt. The SERIAL_DSR interrupt causes a SEND_DSR_TO_HANDSET task to execute which sends a supervisory channel command to the handset 114. When the supervisory channel interpreter on the handset 114 receives that command, it instructs the data serial port controller 312 to generate a DSR signal on the data serial port 310.

More generally, tasks on the handset 114 and the base 118 use the supervisory channel to send commands to each other to generate communication signals (e.g., CD, RTS and CTS signals) on their respective serial interfaces. Generally, the 4-bit control value of the supervisory channel word may be set to a value representing a command to generate a particular signal on a pin of a communication interface (e.g., a serial port). The first three bits of the 8-bit data byte correspond to the value of the communication signal. While generally only one bit is needed to represent signals having only to two values (high or low), the three bit field permits the present invention to operate with other interface protocols wherein signals have more than two states. The particular value of a communication signal may be based on the value of a global flag or variable corresponding to a particular signal, the value of the global flag being changed as the corresponding signal changes between possible states. The other five bits of the 8-bit data byte are set to a value that references one of the pins (or lines) on a communication interface according to a predetermined mapping. A supervisory channel interpreter receiving a sequence of frames which include a 4-bit communication signal command, a 3-bit signal value, and a 5-bit pin value instructs a data serial port controller to generate the signal (usually high or low) indicated by the 3-bit signal value on the particular pin referenced by the 5-bit pin value.

Once the DSR signal is generated on the data serial port 310, then, in a further step 914, the computer 112 detects the DSR signal on pin 6, indicating that the handset 114 is ready to support data communications. A user of the computer 112 then invokes the application program 302 to begin a data communication session with a remote computer. The user may directly invoke the communications module 304 or the application program 302 may invoke the communication module 304. In either case, the communication module 304, in the step 914, generates a dialing command and sends the dialing command over the line 308 to the serial port 306. More particularly, the communication module 304 generates a string of ASCII character values and issues an I/O command which transmits the characters, as a stream of bits, to pin 2 of the serial port 306. The bits of the dialing command propagate along the serial cable 106 to pin 2 of the data serial port 310.

In accordance with one implementation of the Hayes modem command set, the dialing command comprises 8-bit character values. One example of a dialing command for dialing the telephone number 1 (714) 123-4567 is "ATDT17141234567\13". In that dialing command, the characters "AT" derive from the word "attention," to attract the modem's attention. The next letter, "D," stands for "dial," and the letter "T" indicates that "tone" dialing (not pulse) should be used. Each of the numbers is an ASCII character representing a corresponding digit key of a telephone. Lastly, the "\13" represents a carriage return character having the ASCII value 13. The carriage return character marks the end of (i.e., terminates) the dialing command.

When issued to a Hayes compatible modem, the dialing command causes the modem to go off-hook (open a connection to a telephone line), and dial the numbers 1 714 123 4567 using tone dialing. The Hayes modem command set includes other dialing commands, and, as will be understood by those of ordinary skill in the art, the present invention is not limited by a particular dialing command.

In a next step 916, the bits comprising the dialing command are detected at the data serial port 310 by the data serial port controller 312, buffered on the handset 114 as described in connection with FIG. 11, formatted into one or more bursts by the TDD of the wireless modem 362, and, as represented by RF signals, transmitted by the radio 380 to the base 118.

In a further step 918, a number of RF signal frames representing the dialing command are received in turn by the base 118. Bits representing the dialing command are reconstructed from the RF signals, buffered on the base 118 as described in relation to FIG. 12, and propagated to the modem 487.

In a step 920, the modem 487 receives the dialing command, goes off-hook, and issues to the telephone line a tone dialing sequence corresponding to the telephone number specified in the dialing command. A remote modem detects the ring and answers. The modem 487 responds by sending a hailing tone, and the remote modem then sends a higher-pitched tone at which point the modem 487 and the remote modem engage in handshaking. In the handshaking process, the two modems agree on certain data communication parameters such as, for example, transmission speed, coding, start/stop bits, parity bits, and half or full duplex. Handshaking between modems is well known in the art and will not be further described herein. When the handshaking process is complete, the modem 487 sends an active (high) signal on the RLSD line.

The data serial port controller 412 detects the RLSD signal and generates a CARRIER_DETECT interrupt. That interrupt causes the INTERRUPT_SERVICE_ROUTINE 530 to execute a DATACOM_ESTABLISHED task on the base 118.

In a step 922, the DATACOM_ESTABLISHED task sets a CD global flag to 1 (initialized earlier to 0), and uses the supervisory channel to send a command to the handset 114 to generate a CD (carrier detect) signal on the data serial port 310. The supervisory channel interpreter on the handset 114 receives the command and instructs the data serial port controller 312 to generate a carrier detect signal (high) on pin 8 of the data serial port 310 to indicate to the computer 112 that a data communication link has been established with the remote computer.

In a further step 924, the communication module 304 on the computer 112 detects the carrier detect signal on pin 8 of the serial port 306 and optionally sends a message to the application program 302 indicating that a data communication link is established.

Processing Data Communication Signals

After the handset 114 and base 118 have established a data communication link, the application program 302 may request to exchange data with a remote computer. The communication module 304 used by the application program 302 may regulate data exchange with the remote computer according to a data transfer protocol such as Kermit or Xmodem. Such data transfer protocols group transmitted data into packets along with error detection codes such as checksums. Data transfer protocols are beyond the scope of the present invention and will not be further discussed. It will be understood that the present invention is not limited by a data transfer protocol.

Figure 13:
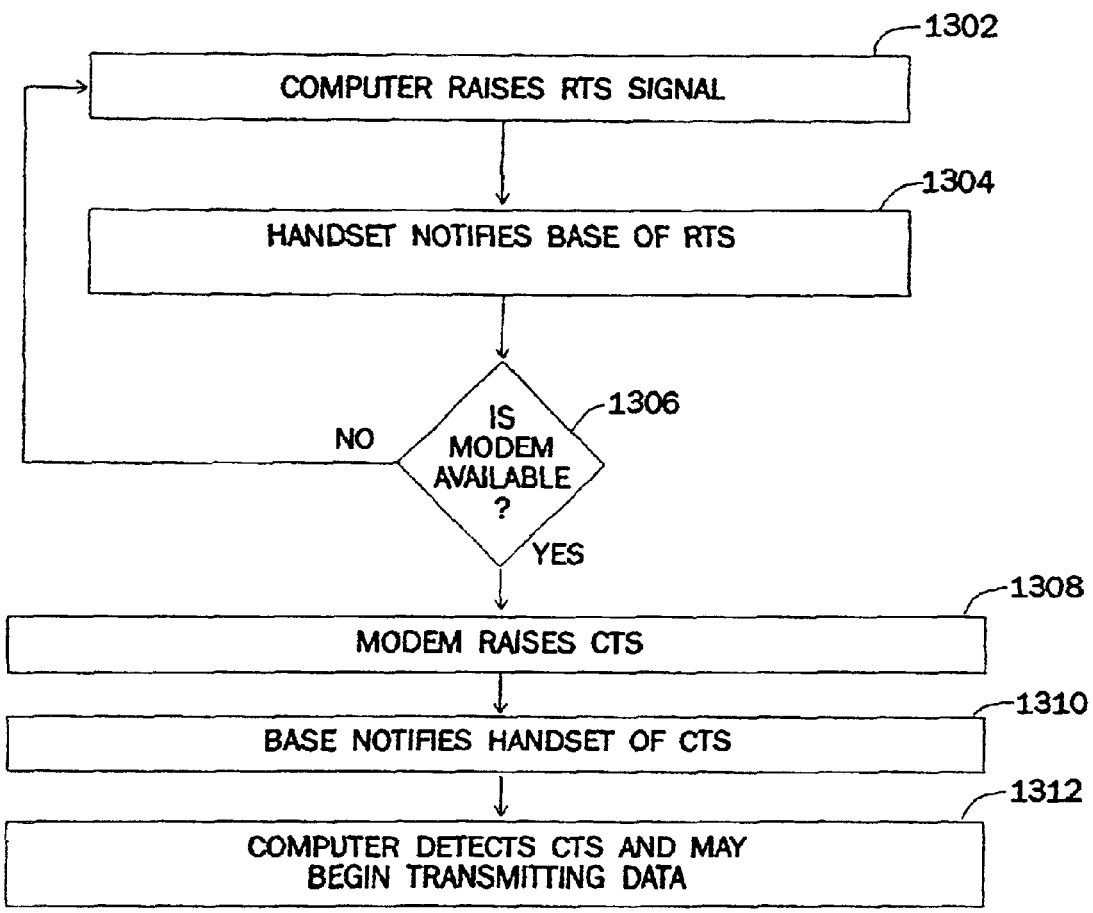
FIG. 13 illustrates steps performed by one embodiment of the present invention to receive at a communication port of a handset a request for data communication and to confirm that data communication may proceed.

FIG. 13 illustrates steps performed by one embodiment of the present invention to receive a request for data communication and to verify that data communication may proceed.

In a first step 1302, the communication module 304 issues a request to transmit data to the remote computer and, accordingly, generates a RTS signal on pin 4 of the serial port 306. The data serial port controller 312 detects the RTS signal on pin 4 of the data serial port 310 and generates a SERIAL_RTS interrupt. In the step 1302, the data serial port controller 312 generates the SERIAL_RTS interrupt whenever it detects a change in the value of the RTS signal on the data serial port 310.

In response to the SERIAL_RTS interrupt, a TRANSMIT_READY task is scheduled and executed on the handset 114. In a next step 1304, to notify the base 118 of the change in the RTS signal, the TRANSMIT_READY task on the handset 114 (1) toggles the value of a RTS_STATUS global flag (representing the changed state of the RTS signal) on the handset 114, (2) sets the 4-bit control value of the supervisory channel word to the communication signal command, and (3) formats the 8-bit data byte of the supervisory channel such that the 3-bit signal value represents the value of the RTS_STATUS global flag and the 5-bit pin value represents the pin (usually pin 4) of the RTS signal. When the number of frames needed for the supervisory channel command are transmitted by the handset 114 and received by the base 118, the supervisory channel interpreter on the base 118 instructs the data serial port controller 412 to generate and maintain the signal specified by the 3-bit signal value on the modem 487 serial interface pin specified by the 5-bit pin value.

In a next step 1306, the modem 487 determines whether it is available to transmit data. If not, the modem 487 generates no CTS signal and processing resumes in the step 1302. If, however, the modem 487 is available to transmit data, then, in a step 1208, the modem 487 generates a CTS signal on the serial interface to the modem 487. The data serial port controller 412 detects the CTS signal and responsively generates a CTS_INTERRUPT. In one embodiment, the data serial port controller 412 generates a CTS_INTERRUPT whenever it detects a change in the value of the CTS signal generated by the modem 487. The modem 487 drops (i.e., changes to low) the CTS signal when the modem 487 is no longer available to transmit data, the dropping causing a CTS_INTERRUPT. The CTS_INTERRUPT causes a MODEM_READY task to execute on the base 118.

In a step 1310, to notify the handset 114 of the change in the CTS signal generated by the modem 487, the MODEM_READY task toggles a CTS_STATUS global flag corresponding to the status of the CTS signal generated by the modem 487. The MODEM READY task also formats a communication signal command for the supervisory channel, using the value of the CTS_STATUS flag to set the value of the 3-bit signal value field, and also setting the 5-bit pin value to correspond to the pin for the CTS signal (generally pin 5). When the frames carrying the supervisory channel command are transmitted by the base 118 and received by the handset 114, a supervisory channel interpreter running on the handset 114 instructs the data serial port controller 312 to generate the signal indicated by the 3-bit signal value on the particular pin specified by the 5-bit pin value (pin 5 carries the CTS signal on a standard serial port).

In a next step 1312, the communication module 304 detects the CTS signal on pin 5 of the serial port 306. The communication module 304 may then notify the application program 302 that data may be transmitted.

Figure 14:
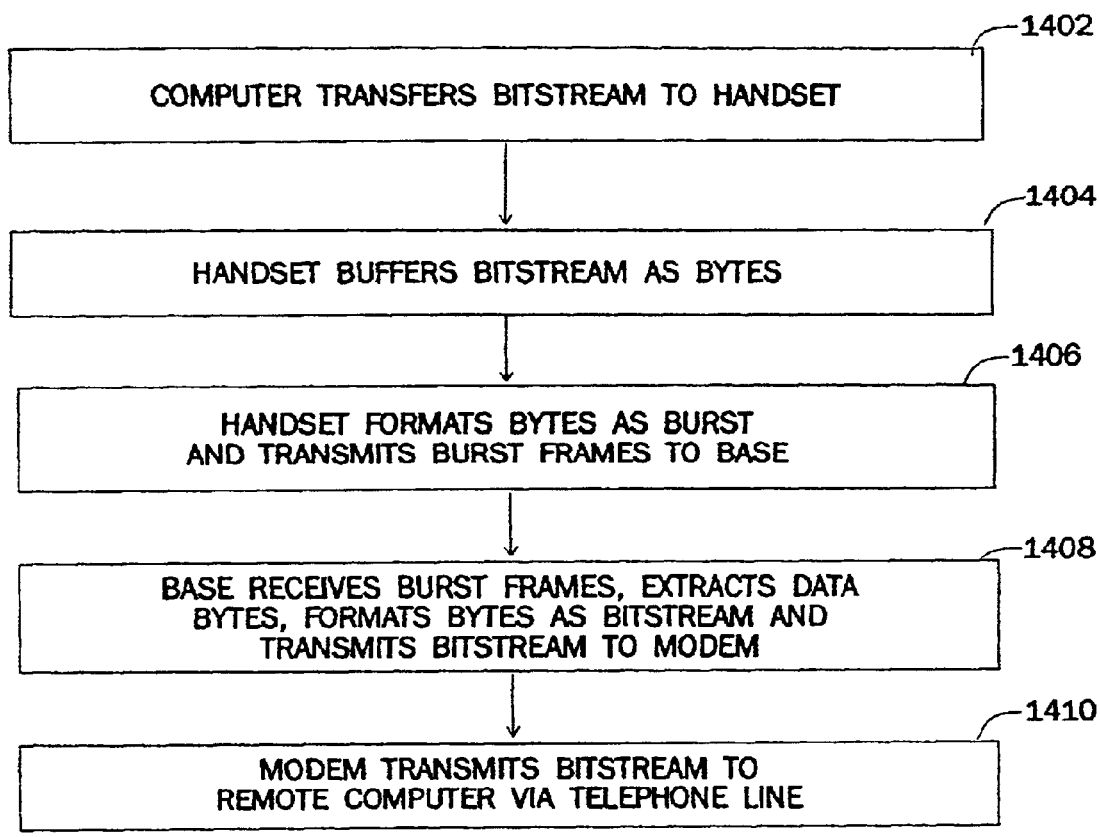
FIG. 14 illustrates steps performed by one embodiment of the present invention to transmit data received from a computer to a remote computer.

FIG. 14 illustrates steps performed by one embodiment of the present invention to transmit data from the computer 112 to the remote computer. In a first step 1402, the application program 302 begins transferring data to the communication module 304, which, in turn, transfers the data as a stream of bits to pin 2 of the serial port 306.

In a further step 1404, the data serial port controller 312 detects the stream of bits on pin 2 of the data serial port 310. The data serial port controller 312 converts each sequence of eight bits into an 8-bit byte, which described in more detail above, is buffered with other bytes in the outgoing data buffer (ODB) 353. As also described above, the handset 114 drops the CTS signal if the outgoing data buffer 353 becomes too full.

In a next step 1406, the TDD controller of the wireless modem 362 on the handset 114 formats frames comprising a burst 1002 including data bytes from the outgoing data buffer 353, and transmits the frames to the base 118. In a further step 1408, the base 118 receives the frames, one at a time, and, through a series of interrupt driven transfers (described above), sends the bytes to the modem 487 via its serial interface.

In a step 1410, the modem 487 transmits the data bytes to the telephone interface 494, which data bytes propagate to the telephone system over the telephone line 110.

Figure 15:
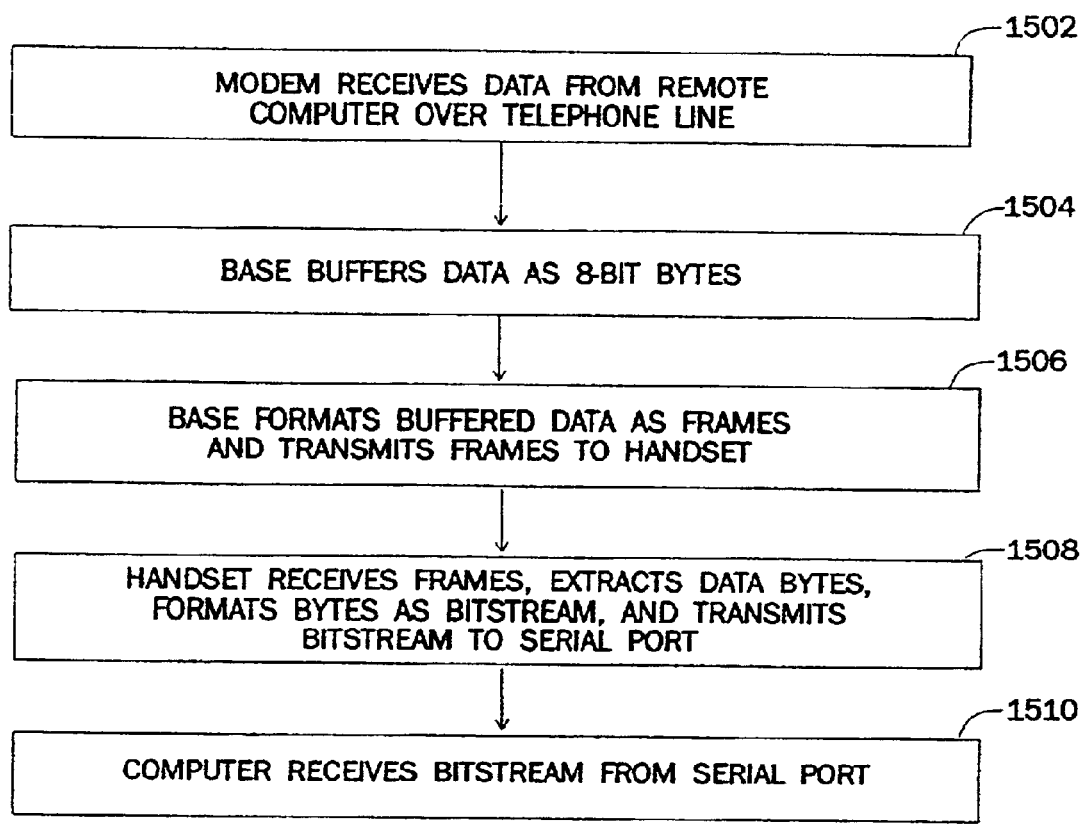
FIG. 15 illustrates steps performed by an embodiment of the present invention to receive data from a remote computer and transmit the data to a local computer.

FIG. 15 illustrates steps performed by an embodiment of the present invention to receive data from a remote computer over a telephone line and transmit the data to a local computer 112. In a first step 1502, the modem 487 receives data over the telephone line 110. The modem 487 transmits the received data to the serial port on its RXD line.

In a next step 1504, the data serial port controller 412 detects the data on the RXD line, converts each 8-bit sequence into a byte, and generates a SERIAL_DATA_IN interrupt. In response to that interrupt, the SERIAL_DATA_INPUT task executes and buffers each byte into the outgoing data buffer (ODB) 453. As described above, the BUFFER_TRANSFER task ensures that the ODB 453 does not reach an overflow condition by transmitting to the remote modem a pause signal when the ODB 453 becomes too full. Modem-to-modem pause signals are known in the art, and the present invention is not limited by a modem-to-modem pause signal. In a further step 1506, the TDD controller in the wireless modem 462 formats frames, as needed, which include the data bytes buffered in the outgoing data buffer 453, and transmits the frames in bursts to the handset 114.

In a step 1508, the handset 114 receives frames in sequence from the base 118, buffers the data bytes represented in the received frames, and propagates the bytes to the serial port 310 where the bytes are transmitted as a bitstream on pin 3 of the data serial port 310. In a next step 1510, the computer 112 receives the bitstream on pin 3 of the serial port 306.

Terminating Data Communications

The computer 112 terminates data communications by dropping DTR and RTS signals on the serial port 306. The change in signals (i.e., the dropping of signals) is detected on the data serial port 310 by the data serial port controller 312. The change in the DTR signal causes the data serial port controller 312 to generate a SERIAL_DTR interrupt, which causes the DATACOM_READY task to execute. The DATACOM_READY task accesses the DATACOM flag and, if one (1), toggles its value to zero (0) to indicate that data communication is terminated. When the DATACOM_READY task toggles the DATACOM flag to zero (0) to terminate data communications, it performs a number of steps.

First, it de-installs burst processing tasks. To do so, it replaces certain addresses in the jump table 528, namely, the address of the BUFFER_TRANSFER task is replaced with the address of the CODEC_AE_TRANSFER task, and the address of the TRANSMIT_BURST task is replaced with the address of the TRANSMIT_DATA_FRAME task.

Finally, the DATACOM_READY task formats a supervisory channel command to instruct the base 118 to terminate data communication. In one embodiment, the 3
- bit data type value is set to a value indicating that a command is represented in the 5-bit value field, and the 5-bit value field is configured to represent a TERMINATE_DATACOM command. The handset 114 transmits this command to the base 118 using the supervisory channel.

A supervisory channel interpreter running on the base 118 detects the TERMINATE_DATACOM command, and schedules a TERMINATE_DATACOM task for execution on the base 118. The TERMINATE_DATACOM task terminates data communications by causing the hook relay in the telephone interface 494 to go on hook. The TERMINATE_DATACOM task also de-installs burst processing task as described above.

Alternative Burst Formats

In the preferred embodiment, the handset 114 and base 118 use an active frame format protocol corresponding to a two-frame burst format for data communication. While the two-frame burst format comprises one data frame and one raw frame, other burst formats comprising additional or fewer raw frames may be advantageous. Moreover, the number of frames allocated per burst may differ as between the handset 114 and base 118. For example, if the local computer 112 transmits substantially more data during a communication session than a remote computer, it may be beneficial to allocate more raw frames (e.g., two or three) per burst transmitted by the handset 114, and fewer raw frames (e.g., zero or one) per burst transmitted by the base 118. It will be understood that steps of the present invention to alter burst formats include:
- (1) a supervisory channel command formatted and sent by one component (handset 114 or base 118) to the other component requesting a change to a specified frame format protocol;
- (2) an acknowledgement from the other component that it will cooperate in changing the frame format protocol;
- (3) the handset 114 transmitting a flow control pause command to the computer 112, and the base 118 transmitting a pause command to the remote computer via the modem 487;
- (4) a delay to allow the transfer of any data in buffers on either the handset 114 or the base 118 to complete;
- (5) handset 114 initiates new data link, including sending a data frame to the base 118, the data frame including bit information corresponding to the requested and specified frame format protocol;
- (6) appropriately setting the frame format bits and the transmit/receive signal (tx or rx enable bits) before each transmit or receive event on the handset 114 and the base 118 in accordance with the selected active frame format protocol; and
- (7) setting the MAX_OB_FRAME variable accordingly on the handset 114 and base 118.

In accordance with the present invention, burst formats may be changed by command generated by software running on the computer 112, or may be established dynamically. In changing burst format by command, software instructions on the handset 114 and base 118 monitor the value of bytes received from the computer 112. Software running on the computer 112 transmits an extended modem command of the format, for example, "+ATBFxy", where "+AT" refers to ATTENTION, "BF" refers to change in BURST FORMAT, x is an 8-bit value representing the number of raw frames per burst for bursts transmitted by the handset 114, and y is an 8-bit value representing the number of raw frames per burst for bursts transmitted by the base 118. When the monitoring software on the handset 114 detects the "+ATBFxy" sequence, it modifies the active frame format protocol to configure the handset 114 to transmit bursts having x raw frames, and to receive bursts having y raw frames. The monitoring software on the handset 114 generates a supervisory channel command to the base 118 requesting that the base 118 alter its raw frame allocation (modify its active frame format protocol) to transmit bursts having y raw frames and to receive bursts having x raw frames. The handset 114 and base 118 then modify the frame format protocol as described above.

In one embodiment of the present invention, the command monitoring software is included in the SERIAL_DATA_INPUT task and thus executes upon the occurrence of the SERIAL_DATA_IN interrupt. In particular, the SERIAL_DATA_INPUT task examines bytes being transferred from the serial port receive buffer (SPRB) 315 to the outgoing data buffer 353. When the command monitoring instructions of the SERIAL_DATA_INPUT task detect the "+ATBFxy" byte pattern, the handset 114 and the base 118 perform the steps described above to alter the frame format protocol according to the x and y parameters of the detected "+ATBFxy" command. The monitoring instructions of the SERIAL_DATA_INPUT task may prevent the "+ATBFxy" command bytes from being transferred beyond the outgoing data buffer 353 by not advancing the next location pointer when it transfers each byte of the "+ATBFxy" command.

To format a supervisory channel command for the base 118, the SERIAL_DATA_INPUT task sets the 3-bit data type field of the 8-bit supervisory channel field to indicate a burst format change command, and the 5-bit data field includes a value corresponding to a change in burst format. The next two 8-bit supervisory channel fields are set to match the x and y parameters of the "+ATBFxy" command.

The supervisory channel interpreter running on the base 118 receives the command and also the two parameters, performs the steps required to alter the burst format on the base to transmit bursts having y raw frames, and receive bursts having x raw frames.

In another embodiment, extended modem commands may correspond directly to a particular frame format protocol without specifying numbers of raw frames. In one embodiment, a "+ATBF1" command refers to a particular configuration wherein the handset 114 transmits bursts having one raw frame, and the base 118 transmits bursts having one raw frame. The following table identifies additional configurations indicated by additional extended modem commands.

| Extended Modem Command | Number of Raw Frames Per Burst Transmitted By Handset | Number of Raw Frames Per Burst Transmitted By Base |
|---|---|---|
| +ATBF1 | 1 | 1 |
| +ATBF2 | 2 | 2 |
| +ATBF3 | 2 | 1 |
| +ATBF4 | 1 | 2 |
| +ATBF5 | 3 | 1 |
| +ATBF6 | 1 | 3 |

It will be appreciated that, in this embodiment, the SERIAL_DATA_INPUT task associates predetermined frame format protocols with each detected "+ATBF" command, rather than obtain that information directly from the command. It will also be appreciated that the supervisory channel command generated by the SERIAL_DATA_INPUT task need not specify any parameters indicating the number of raw frames. Rather, the supervisory channel interpreter on the base 118 can compare a particular received command against predetermined command values, each predetermined command value corresponding to a frame format protocol associated with a predetermined "+ATBF" command.

In another embodiment of the present invention, the handset 114 and base 118 alter the raw frame allocation of bursts dynamically. To do so, instructions of the TRANSMIT_BURST task keep track of the number of bytes transmitted by the base 118, and instructions of the RECEIVE_BURST task executing on the base 118 keep track of the number of bytes transmitted by the handset 114. In particular, upon determining the number of bytes that will be transmitted in a burst, instructions of the TRANSMIT_BURST task add that number to a TOTAL_BYTES_TRANSMITTED variable (initialized to 0 upon establishing data communications). Likewise, instructions of the RECEIVE_BURST task, upon determining the number of bytes in a burst being received from the handset 114, add that number to a TOTAL_BYTES_RECEIVED variable (also initialized to 0). The instructions of the RECEIVE_BURST task compare the TOTAL_BYTES_TRANSMITTED and TOTAL_BYTES_RECEIVED variables.

If one is significantly less than the other (e.g., one is less than 90% of the other), then the handset 114 and the base 118 perform the burst format altering steps described above to change the allocation of raw frames. If the TOTAL_BYTES_RECEIVED variable is the larger, then the burst format of bursts transmitted by the handset 114 may be altered. Specifically, if the number of raw frames of bursts transmitted by the handset 114 is currently the same as or one greater than the number of raw frames of bursts from the base 118, then the active frame format protocol alters the raw frame allocation on the handset 114 to include one more raw frame. If the number of raw frames per handset burst currently exceeds by two the number of raw frames per base burst, then, in one embodiment, no change is made. It will be readily appreciated that other thresholds besides two may be used. If the number of raw frames per handset burst is less than the number currently allocated to each base burst, then the active frame format protocol is modified to reduce by one the number of raw frames per base burst. Thus, in one embodiment, the number of raw frames per burst on the handset 114 and the base 118 may vary over the duration of a data communication session according to the following combinations:

| | Number of Raw Frames Per Burst Transmitted By Handset | Number of Raw Frames Per Burst Transmitted By Base |
|---|---|---|
| Raw Frame Allocation at Time $t_0$* | 1 | 1 |
| Raw Frame Allocation at Time $t_1$ | 2 | 1 |
| Raw Frame Allocation at Time $t_2$ | 3 | 1 |
| Raw Frame Allocation at Time $t_3$ | 1 | 2 |
| Raw Frame Allocation at Time $t_4$ | 1 | 3 |

*times $t_0$–$t_4$ are not necessarily in temporal order

It will be appreciated that, in one embodiment of the present invention, a new link is established to use a new frame format protocol. If the TOTAL_BYTES_TRANSMITTED variable is the larger, then the burst format allocation rules described above are applied in the same manner, only with the roles of the handset 114 and the base 118 reversed. When the RECEIVE_BURST task (executing on the base 118) determines that a burst format change is to be made, it formats a supervisory channel command to request that the handset 114 cooperate in altering the burst format. In one embodiment, the 3-bit data type field of the 8-bit supervisory channel field is set to indicate a burst format command, and the 5-bit data field includes a value corresponding to a change in burst format. The 5-bit field may have one value corresponding particularly to a change in allocation of raw frames for bursts transmitted, and a different value indicating a change for bursts received. The number of raw frames specified by the command is indicated in a following 8-bit supervisory channel field, particularly indicated in the 5-bit data field, with the 3-bit field set to a value indicating that the 5-bit field includes data. The supervisory channel interpreter running on the handset 114 receives the command and also the number of raw frames, the handset 114 sends an acknowledgement that it will cooperate in changing the frame format protocol. Then the handset 114 and the base 118 performs the steps required to alter the active frame format protocol.

Upon each alteration in burst format, the instructions of the RECEIVE_BURST task set to zero (0) the value of the TOTAL_BYTES_RECEIVED and TOTAL_BYTES_TRANSMITTED variables. In one embodiment, to ensure that any adjustment in burst format is based on a sufficient history of frame transmissions to make a comparison meaningful, no comparison of the two variables is performed until one of them exceeds one thousand (1000). It will be appreciated that the present invention may operate using values other than one thousand. Other dynamic frame format adjustment rules may be used without departing from the concept of dynamically adjusting the burst formats used by the handset 114 and the base 118 to better accommodate the circumstance where the quantity of data traveling in one direction is significantly greater than the quantity of data traveling in the other direction.

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description. Any and all changes which come within the meaning and range of equivalency of the claims are to be considered within their scope.

What is claimed is:

1. A wireless unit comprising:

a first communication port;

a communication port controller responsive to first data received at said first communication port to buffer said first data;

a second communication port configured to couple to an audio input line;

a codec responsive to a sampling interrupt to generate a audio sample from available audio data received at said second communication port;

a wireless modem responsive to a first signal to encode said first data in a first frame, wherein said first signal is derived from command data received at said communication port, and wherein said wireless modem is responsive to a second signal to encode said audio sample in a second frame; an a radio transceiver responsive to said first signal and to a frame interrupt to transmit a first RF signal frame representing said first frame, and responsive to said second signal and to said frame interrupt to consecutively transmit a second RF signal frame representing said second frame, said radio transceiver receiving no RF signal between said transmission of said first and second RF signal frames.

2. A wireless unit comprising:

a microcontroller;

a data memory;

a computer communication port;

an outgoing data buffer storing data bits received at said computer communication port;

an auxiliary communication port configured to receive audio input;

a codec;

a frame buffer storing bits to be represented by an RF signal;

a sample transfer routine comprising instructions stored in said data memory, said instructions executable by said microcontroller, said sample transfer routine responsive to a codec interrupt to transfer available first audio samples received at said auxiliary communication port to said codec, and to transfer available second audio samples from said codec to said frame buffer; and a data transfer routine comprising instructions stored in said data memory, said instructions executable by said microcontroller, said data transfer routine responsive to said codec interrupt to transfer data from said outgoing data buffer to said frame buffer, wherein said audio samples and said data are consecutively stored in said frame buffer for transmission as a pair.

3. The wireless unit of claim 2, further comprising:

a radio transceiver;

a frame receive buffer storing bits representing RF signals received by said radio transceiver; and an incoming data buffer storing data bits transferred from said frame receive buffer by said data transfer routine in response to said codec interrupt.

4. The wireless unit of claim 2, further comprising:

a data communication establishment routine comprising instructions stored in said data memory, said instructions executable by said microcontroller, said data communication establishment routine responsive to a data communication signal at said computer communication port to disable said sample transfer routine and to enable said data transfer routine.

5. A method for communicating voice and data signals, said method comprising:

determining if a first analog audio sample is available at a communication port of a wireless communication device;

if the first analog audio sample is available:

converting said first analog audio sample to a firs digital audio sample;

compressing said digital audio sample to a create a first compressed audio sample;

generating first RF signals to represent said first compressed audio sample;

transmitting with a radio transceiver said first RF signals in a first RF signal frame;

receiving with said radio transceiver a second RF signal frame including second RF signals;

decompressing said second RF signals to create a second digital audio sample;

converting said second digital audio sample to a second analog audio sample;

transmitting said second analog audio sample to an audio output of said wireless communication device;

receiving first data at a communication port of said wireless communication device;

generating third RF signals representing said first data; and transmitting with said radio transceiver said third RF signals in third and fourth consecutive RF frames if said first analog audio sample is available, said radio transceiver receiving no RF frame between said transmission of said third and fourth RF frames.

6. The method of claim 5 wherein said first, second, third and fourth RF frames have the same duration and are transmitted at the same frequency, and wherein the number of data bits represented in said fourth RF frame exceeds the number of data bits represented in said third RF frame and also exceeds the number of compressed audio sample bits represented in said first and second RF frames.

7. The method of claim 6 further comprising:

determining that a different frame format protocol will be used;

completing the transfer of any data in data buffers of said wireless communication device;

transmitting an RF data frame to a second wireless communication device, said RF data frame specifying said different frame format protocol; and establishing a new wireless link wherein said wireless communication device and said second wireless communication device use said different frame format protocol.

* * * * *

UNITED STATES PATENT AND TRADEMARK OFFICE
CERTIFICATE OF CORRECTION

PATENT NO. : 6,842,623 B2
APPLICATION NO. : 09/974769
DATED : January 11, 2005
INVENTOR(S) : Michael E. Koscal It is certified that error appears in the above-identified patent and that said Letters Patent is hereby corrected as shown below:

Title page column 1 (Title), line 3, delete "COMMUNICATION" and insert -- COMMUNICATIONS --, therefor.

Sheet 9 of 16 (Figure 8), box 812 line 4, delete "AUDO" and insert -- AUDIO --, therefor.

Sheet 11 of 16, Figure 10 (below 1004), below "1004" delete "Guard Blt" and insert -- Guard Bit --, therefor.

Sheet, 11 of 16, Figure 10, delete "Supervisory Blts" and insert -- Supervisory Bits --, therefor.

Column 1, line 3, delete "COMMUNCATION" and insert -- COMMUNICATIONS -- therefor.

Column 1, line 6 (Approximately), delete "claim" and insert -- claims --, therefor.

Column 1, line 10 (Approximately), delete "COMMUNICATION" and insert -- COMMUNICATIONS --, therefor.

Column 4, line 40, delete "code" and insert -- codec --, therefor.

Column 8, line 39 (Approximately), delete ".often" and insert -- often --, therefor.

Column 16, line 37, after "interrupts)" insert -- . --, therefor.

Column 21, line 14, delete "$CODEC_{13}$" and insert -- $CODEC\_$ --, therefor.

Column 41, line 21, in claim 1, delete "a" and insert -- an --, therefor.

UNITED STATES PATENT AND TRADEMARK OFFICE
CERTIFICATE OF CORRECTION

PATENT NO. : 6,842,623 B2
APPLICATION NO. : 09/974769
DATED : January 11, 2005
INVENTOR(S) : Michael E. Koscal It is certified that error appears in the above-identified patent and that said Letters Patent is hereby corrected as shown below:

Column 41, line 29, in claim 1, delete "an" and insert -- and --, therefor.

Column 42, line 21 (Approximately), in claim 5, delete "firs" and insert -- first --, therefor.

Signed and Sealed this

Sixteenth Day of January, 2007

JON W. DUDAS
*Director of the United States Patent and Trademark Office*